(12) United States Patent
Akanishi et al.

(10) Patent No.: US 10,295,041 B2
(45) Date of Patent: May 21, 2019

(54) BICYCLE SPROCKET AND BICYCLE SPROCKET ASSEMBLY

(71) Applicant: SHIMANO INC., Sakai (JP)

(72) Inventors: Kenichi Akanishi, Sakai (JP); Atsuhiro Emura, Sakai (JP)

(73) Assignee: SHIMANO INC., Sakai (JP)

( * ) Notice: Subject to any disclaimer, the term of this patent is extended or adjusted under 35 U.S.C. 154(b) by 190 days.

(21) Appl. No.: 15/390,685

(22) Filed: Dec. 26, 2016

(65) Prior Publication Data

US 2018/0180157 A1   Jun. 28, 2018

(51) Int. Cl.
   *B62M 9/12*   (2006.01)
   *F16H 55/30*  (2006.01)

(52) U.S. Cl.
   CPC ............ *F16H 55/30* (2013.01); *B62M 9/12* (2013.01)

(58) Field of Classification Search
   CPC .......... F16H 55/30; F16H 7/06; B62M 9/105; B62M 9/10; B62M 9/00
   USPC ................................. 474/156, 160
   See application file for complete search history.

(56) References Cited

U.S. PATENT DOCUMENTS

| | | | | |
|---|---|---|---|---|
| 586,991 | A * | 7/1897 | Curley | F16H 55/30 474/156 |
| 3,969,947 | A * | 7/1976 | Martin | F16H 55/30 474/156 |
| 4,174,642 | A * | 11/1979 | Martin | F16H 55/30 474/152 |
| 4,867,733 | A * | 9/1989 | Yamanoi | B62M 9/00 474/161 |
| 6,203,462 | B1 * | 3/2001 | Takamori | B62M 9/02 474/156 |
| 6,325,734 | B1 * | 12/2001 | Young | F16H 7/06 474/156 |
| 6,666,786 | B2 * | 12/2003 | Yahata | B62M 9/105 474/152 |
| 7,258,638 | B2 * | 8/2007 | Valle | B62M 9/105 474/152 |
| 9,182,027 | B2 * | 11/2015 | Reiter | B62M 9/105 |
| 9,297,452 | B2 * | 3/2016 | Iwai | F16H 55/30 |
| 9,394,986 | B2 * | 7/2016 | Pfeiffer | B62M 9/105 |
| 9,404,565 | B2 * | 8/2016 | Pfeiffer | B62M 9/10 |
| 9,457,870 | B2 * | 10/2016 | Sugimoto | B62M 9/105 |
| 9,540,070 | B2 * | 1/2017 | Watarai | B62M 9/02 |
| 9,669,899 | B2 * | 6/2017 | Barefoot | B62M 9/00 |
| 9,873,481 | B2 * | 1/2018 | Braedt | B62M 9/12 |
| 9,885,409 | B1 * | 2/2018 | Fukunaga | B62M 9/10 |

(Continued)

*Primary Examiner* — Henry Y Liu
(74) *Attorney, Agent, or Firm* — Mori & Ward, LLP

(57) ABSTRACT

A bicycle sprocket comprises a sprocket body and chain-driving teeth. The chain-driving teeth each have a first axial surface, a second axial surface, a driving surface, and a non-driving surface. The chain-driving teeth comprises at least one first tooth and at least one second tooth. The at least one first tooth has a first maximum chain-engaging width defined in the axial direction. The at least one second tooth has a second maximum chain-engaging width defined in the axial direction. The first maximum chain-engaging width is larger than the second maximum chain-engaging width. The at least one second tooth includes a first chamfer provided between the first axial surface of the at least one second tooth and the driving surface of the at least one second tooth.

27 Claims, 22 Drawing Sheets

(56) References Cited

U.S. PATENT DOCUMENTS

| | | | |
|---|---|---|---|
| 2002/0086753 A1* | 7/2002 | Yahata | B62M 9/105 474/160 |
| 2004/0009838 A1* | 1/2004 | Valle | B62M 9/105 474/160 |
| 2005/0079940 A1* | 4/2005 | Reiter | B62M 9/10 474/160 |
| 2005/0282671 A1* | 12/2005 | Emura | B62M 9/06 474/160 |
| 2007/0054768 A1* | 3/2007 | Miyazawa | F16H 55/30 474/152 |
| 2008/0202284 A1* | 8/2008 | Valle | B62M 3/00 74/594.1 |
| 2013/0072334 A1* | 3/2013 | Braedt | B62M 9/10 474/156 |
| 2013/0109519 A1* | 5/2013 | Morita | F16H 7/06 474/148 |
| 2013/0139642 A1* | 6/2013 | Reiter | B62M 9/105 74/594.2 |
| 2013/0184110 A1* | 7/2013 | Reiter | F16H 55/303 474/152 |
| 2014/0013900 A1* | 1/2014 | Shiraishi | B62M 9/105 74/594.2 |
| 2014/0338494 A1* | 11/2014 | Sugimoto | B62M 1/36 74/594.2 |
| 2014/0364259 A1* | 12/2014 | Reiter | F16H 55/30 474/155 |
| 2015/0094179 A1* | 4/2015 | Iwai | F16H 55/30 474/152 |
| 2015/0198231 A1* | 7/2015 | Emura | B62M 9/105 474/156 |
| 2015/0210352 A1* | 7/2015 | Sugimoto | B62M 9/105 474/80 |
| 2015/0226305 A1* | 8/2015 | Pfeiffer | F16H 55/30 474/152 |
| 2015/0226308 A1* | 8/2015 | Pfeiffer | B62M 9/105 474/152 |
| 2015/0285362 A1* | 10/2015 | Pfeiffer | F16H 55/30 474/152 |
| 2015/0285363 A1* | 10/2015 | Pfeiffer | F16H 55/30 474/152 |
| 2016/0053882 A1* | 2/2016 | Watarai | F16H 55/30 474/152 |
| 2016/0347409 A1* | 12/2016 | Watarai | B62M 9/02 |

* cited by examiner

BICYCLE SPROCKET AND BICYCLE SPROCKET ASSEMBLY

BACKGROUND OF THE INVENTION

Field of the Invention

The present invention relates to a bicycle sprocket and a bicycle sprocket assembly.

Discussion of the Background

Bicycling is becoming an increasingly more popular form of recreation as well as a means of transportation. Moreover, bicycling has become a very popular competitive sport for both amateurs and professionals. Whether the bicycle is used for recreation, transportation or competition, the bicycle industry is constantly improving the various components of the bicycle. One bicycle component that has been extensively redesigned is a sprocket.

SUMMARY OF THE INVENTION

In accordance with a first aspect of the present invention, a bicycle sprocket comprises a sprocket body and chain-driving teeth. The sprocket body includes a radially outer periphery provided about a rotational center axis of the bicycle sprocket. The chain-driving teeth are provided on the radially outer periphery to engage with a bicycle chain. The chain-driving teeth each have a first axial surface, a second axial surface opposite to the first axial surface in an axial direction parallel to the rotational center axis, a driving surface facing in a driving rotational direction in which the bicycle sprocket is rotated during pedaling, and a non-driving surface opposite to the driving surface in a circumferential direction defined about the rotational center axis. The chain-driving teeth comprises at least one first tooth and at least one second tooth. The at least one first tooth has a first maximum chain-engaging width defined in the axial direction. The at least one second tooth has a second maximum chain-engaging width defined in the axial direction. The first maximum chain-engaging width is larger than the second maximum chain-engaging width. The at least one second tooth includes a first chamfer provided between the first axial surface of the at least one second tooth and the driving surface of the at least one second tooth.

With the bicycle sprocket according to the first aspect, the first chamfer smoothly guides the bicycle chain when the bicycle chain comes into engagement with the at least one second tooth even if a chain line of the bicycle chain is inclined relative to the bicycle sprocket toward a first side relative to the bicycle sprocket. This smoothes the engagement of the bicycle chain with the at least one second tooth, reducing noise occurring when the bicycle chain comes into engagement with the at least one second tooth.

In accordance with a second aspect of the present invention, the bicycle sprocket according to the first aspect is configured so that the first maximum chain-engaging width is larger than an inner link space defined between an opposed pair of inner link plates of the bicycle chain in the axial direction and smaller than an outer link space defined between an opposed pair of outer link plates of the bicycle chain in the axial direction. The second maximum chain-engaging width is smaller than the inner link space.

With the bicycle sprocket according to the second aspect, the at least one first tooth improves chain-holding performance of the bicycle sprocket.

In accordance with a third aspect of the present invention, the bicycle sprocket according to the first or second aspect is configured so that the first chamfer has a first radially outer end and a first radially inner end and radially extends between the first radially outer end and the first radially inner end. The first chamfer has a maximum circumferential chamfered-length defined in the circumferential direction at a radial position defined between the first radially outer end and the first radially inner end.

With the bicycle sprocket according to the third aspect, the first chamfer effectively reduces noise occurring when the bicycle chain comes into engagement with the at least one second tooth.

In accordance with a fourth aspect of the present invention, the bicycle sprocket according to any one of the first to third aspects is configured so that the first chamfer has a maximum circumferential chamfered-length and a maximum axial chamfered-length. The maximum circumferential chamfered-length is defined in the circumferential direction. The maximum axial chamfered-length is defined in the axial direction. The maximum axial chamfered-length is smaller than the maximum circumferential chamfered-length.

With the bicycle sprocket according to the fourth aspect, the first chamfer reduces noise occurring when the bicycle chain comes into engagement with the at least one second tooth while rigidity of the at least one second tooth is maintained.

In accordance with a fifth aspect of the present invention, the bicycle sprocket according to any one of the first to fourth aspects is configured so that the at least one second tooth has a border line defined between the driving surface of the at least one second tooth and the first chamfer of the at least one second tooth. The border line includes a straight line when viewed from the circumferential direction.

With the bicycle sprocket according to the fifth aspect, the first chamfer effectively reduces noise occurring when the bicycle chain comes into engagement with the at least one second tooth.

In accordance with a sixth aspect of the present invention, the bicycle sprocket according to any one of the first to fifth aspects is configured so that the first chamfer has a first radially outer end and a first radially inner end and radially extends between the first radially outer end and the first radially inner end. The first radially outer end is closer to a tooth tip of the at least one second tooth than the first radially inner end. The first radially outer end is disposed radially inwardly of the tooth tip of the at least one second tooth.

With the bicycle sprocket according to the sixth aspect, the positional relationship between the first radially outer end and the tooth tip maintains a thickness of the tooth tip of the at least one second tooth. This reduces damage of the tooth tip of the at least one second tooth when the bicycle chain comes into engagement with the at least one second tooth.

In accordance with a seventh aspect of the present invention, the bicycle sprocket according to any one of the first to sixth aspects is configured so that the first chamfer has a maximum circumferential chamfered-length defined in the circumferential direction at a radial position defined between a tooth tip of the at least one second tooth and a reference line defined to connect centers of neighboring pins of the bicycle chain engaged with the chain-driving teeth when viewed from the axial direction.

With the bicycle sprocket according to the seventh aspect, the position of the maximum circumferential chamfered-length keeps an area of the first axial surface of the at least one second tooth larger. This improves chain-holding performance of the bicycle sprocket.

In accordance with an eighth aspect of the present invention, the bicycle sprocket according to the seventh aspect is configured so that the first chamfer has a first radially outer end and a first radially inner end and radially extends between the first radially outer end and the first radially inner end. The first radially outer end is closer to a tooth tip of the at least one second tooth than the first radially inner end. The first radially inner end is disposed radially inwardly of the reference line.

With the bicycle sprocket according to the eighth aspect, the first chamfer more smoothly guides the bicycle chain when the bicycle chain comes into engagement with the at least one second tooth even if the chain line of the bicycle chain is inclined relative to the bicycle sprocket toward the first side relative to the bicycle sprocket. This effectively reduces noise occurring when the bicycle chain comes into engagement with the at least one second tooth.

In accordance with a ninth aspect of the present invention, the bicycle sprocket according to any one of the first to eighth aspects is configured so that the first chamfer has a maximum circumferential chamfered-length defined in the circumferential direction. The maximum circumferential chamfered-length is equal to or larger than 0.8 mm.

With the bicycle sprocket according to the ninth aspect, the first chamfer more smoothly guides the bicycle chain when the bicycle chain comes into engagement with the at least one second tooth even if the chain line of the bicycle chain is inclined relative to the bicycle sprocket toward the first side relative to the bicycle sprocket. This effectively reduces noise occurring when the bicycle chain comes into engagement with the at least one second tooth.

In accordance with a tenth aspect of the present invention, the bicycle sprocket according to any one of the first to ninth aspects is configured so that the at least one second tooth includes a second chamfer provided between the second axial surface of the at least one second tooth and the driving surface of the at least one second tooth.

With the bicycle sprocket according to the tenth aspect, the second chamfer smoothly guides the bicycle chain when the bicycle chain comes into engagement with the at least one second tooth even if the chain line of the bicycle chain is inclined relative to the bicycle sprocket toward a second side relative to the bicycle sprocket. This effectively reduces noise occurring when the bicycle chain comes into engagement with the at least one second tooth.

In accordance with an eleventh aspect of the present invention, the bicycle sprocket according to the tenth aspect is configured so that the at least one second tooth has an axial center plane defined to bisect the second maximum chain-engaging width of the at least one second tooth in the axial direction. The first chamfer and the second chamfer are symmetrical with respect to the axial center plane.

With the bicycle sprocket according to the eleventh aspect, the first chamfer and the second chamfer more smoothly guide the bicycle chain when the bicycle chain comes into engagement with the at least one second tooth even if the chain line of the bicycle chain is inclined relative to the bicycle sprocket. This more effectively reduces noise occurring when the bicycle chain comes into engagement with the at least one second tooth.

In accordance with a twelfth aspect of the present invention, the bicycle sprocket according to any one of the first to eleventh aspects is configured so that the at least one second tooth includes a third chamfer provided between the first axial surface of the at least one second tooth and the non-driving surface of the at least one second tooth.

With the bicycle sprocket according to the twelfth aspect, the third chamfer smoothly guides the bicycle chain when the bicycle sprocket is rotated in a reversing rotational direction even if the chain line of the bicycle chain is inclined relative to the bicycle sprocket toward the first side relative to the bicycle sprocket. This effectively reduces noise occurring when the bicycle chain is rotated in the reversing rotational direction.

In accordance with a thirteenth aspect of the present invention, the bicycle sprocket according to the twelfth aspect is configured so that the at least one second tooth includes a fourth chamfer provided between the second axial surface of the at least one second tooth and the non-driving surface of the at least one second tooth.

With the bicycle sprocket according to the thirteenth aspect, the fourth chamfer smoothly guides the bicycle chain when the bicycle sprocket is rotated in the reversing rotational direction even if the chain line of the bicycle chain is inclined relative to the bicycle sprocket toward the second side relative to the bicycle sprocket. This more effectively reduces noise occurring when the bicycle chain is rotated in the reversing rotational direction.

In accordance with a fourteenth aspect of the present invention, the bicycle sprocket according to any one of the first to thirteenth aspects is configured so that the at least one first tooth including a fifth chamfer provided between the first axial surface of the at least one first tooth and the driving surface of the at least one first tooth.

With the bicycle sprocket according to the fourteenth aspect, the fifth chamfer reduces interference between the at least one first tooth and the bicycle chain when the bicycle chain comes into engagement with the at least one first tooth.

In accordance with a fifteenth aspect of the present invention, the bicycle sprocket according to the fourteenth aspect is configured so that the first chamfer has a first radially outer end and a first radially inner end and radially extends between the first radially outer end and the first radially inner end. The first chamfer has a maximum circumferential chamfered-length defined in the circumferential direction at a radial position defined between the first radially outer end and the first radially inner end. The fifth chamfer has a fifth radially outer end and a fifth radially inner end and radially extends between the fifth radially outer end and the fifth radially inner end. The fifth chamfer has a maximum circumferential chamfered-length defined in the circumferential direction at a radial position defined between the fifth radially outer end and the fifth radially inner end. The maximum circumferential chamfered-length of the first chamfer is larger than the maximum circumferential chamfered-length of the fifth chamfer.

With the bicycle sprocket according to the fifteenth aspect, the dimensional relationship between the maximum circumferential chamfered-length of the first chamfer and the maximum circumferential chamfered-length of the fifth chamfer keeps an area of the first axial surface of the at least one first tooth larger. This improves chain-holding performance of the bicycle sprocket while the first chamfer reduces noise occurring when the bicycle chain comes into engagement with the at least one second tooth.

In accordance with a sixteenth aspect of the present invention, the bicycle sprocket according to the fourteenth or fifteenth aspect is configured so that the first chamfer has a maximum radial chamfered-length defined between the first radially outer end and the first radially inner end. The fifth chamfer has a maximum radial chamfered-length defined between fifth radially outer end and the fifth radially inner end. The maximum radial chamfered-length of the first chamfer is smaller than the maximum radial chamfered-length of the fifth chamfer.

With the bicycle sprocket according to the sixteenth aspect, the fifth chamfer effectively reduces interference between the at least one first tooth and the bicycle chain when the bicycle chain comes into engagement with the at least one first tooth.

In accordance with a seventeenth aspect of the present invention, the bicycle sprocket according to any one of the first to sixteenth aspects is configured so that the at least one first tooth has a first axial percentage of the first maximum chain-engaging width in an outer link space defined between an opposed pair of outer link plates of the bicycle chain in the axial direction. The at least one second tooth has a second axial percentage of the second maximum chain-engaging width in an inner link space defined between an opposed pair of inner link plates of the bicycle chain in the axial direction. The first axial percentage is smaller than the second axial percentage.

With the bicycle sprocket according to the seventeenth aspect, the first axial percentage allows mud to be removed from the outer link space of the bicycle chain while the second axial percentage improves chain-holding performance of the at least one second tooth.

In accordance with an eighteenth aspect of the present invention, the bicycle sprocket according to the seventeenth aspect is configured so that the second axial percentage is equal to or larger than 80%.

With the bicycle sprocket according to the eighteenth aspect, the second axial percentage further improves chain-holding performance of the at least one second tooth.

In accordance with a nineteenth aspect of the present invention, the bicycle sprocket according to the seventeenth or eighteenth aspect is configured so that the first axial percentage is equal to or smaller than 80%.

With the bicycle sprocket according to the nineteenth aspect, the first axial percentage maintains chain-holding performance of the at least one first tooth with allowing mud to be removed from the at least one first tooth.

In accordance with a twentieth aspect of the present invention, the bicycle sprocket according to any one of the first to nineteenth aspects is configured so that the first chamfer is inclined with respect to the first axial surface of the second tooth and the driving surface of the second tooth.

With the bicycle sprocket according to the twentieth aspect, the first chamfer effectively reduces noise occurring when the bicycle chain comes into engagement with the at least one second tooth.

In accordance with a twenty-first aspect of the present invention, the bicycle sprocket according to any one of the first to twentieth aspects is configured so that the first chamfer has a smooth surface.

With the bicycle sprocket according to the twenty-first aspect, the first chamfer effectively reduces noise occurring when the bicycle chain comes into engagement with the at least one second tooth.

In accordance with a twenty-second aspect of the present invention, the bicycle sprocket according to any one of the first to twenty-first aspects is configured so that the chain-driving teeth are made of a metallic material.

With the bicycle sprocket according to the twenty-second aspect, the metallic material improves rigidity of the chain-driving teeth.

In accordance with a twenty-third aspect of the present invention, the bicycle sprocket according to any one of the first to twenty-second aspects further comprises one of a crank arm attachment part and a hub assembly attachment part.

With the bicycle sprocket according to the twenty-third aspect, it is possible to obtain the same effect as that of the bicycle sprocket according to the first aspect in a front or rear sprocket.

In accordance with a twenty-fourth aspect of the present invention, the bicycle sprocket according to any one of the first to twenty-third aspects is configured so that a total number of the chain-driving teeth is equal to or larger than thirteen.

With the bicycle sprocket according to the twenty-fourth aspect, it is possible to obtain the same effect as that of the bicycle sprocket according to the first aspect in a rear sprocket assembly.

In accordance with a twenty-fifth aspect of the present invention, the bicycle sprocket according to any one of the first to twenty-fourth aspects is configured so that the total number of the chain-driving teeth is equal to or larger than thirty.

With the bicycle sprocket according to the twenty-fifth aspect, it is possible to obtain the same effect as that of the bicycle sprocket according to the first aspect in a front sprocket assembly.

In accordance with a twenty-sixth aspect of the present invention, a bicycle sprocket assembly comprises the bicycle sprocket according to any one of the first to twenty-fifth aspects.

With the bicycle sprocket assembly according to the twenty-sixth aspect, it is possible to obtain the same effect as that of the bicycle sprocket according to the first aspect in the bicycle sprocket assembly.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings.

DESCRIPTION OF THE EMBODIMENTS

Figure 1:
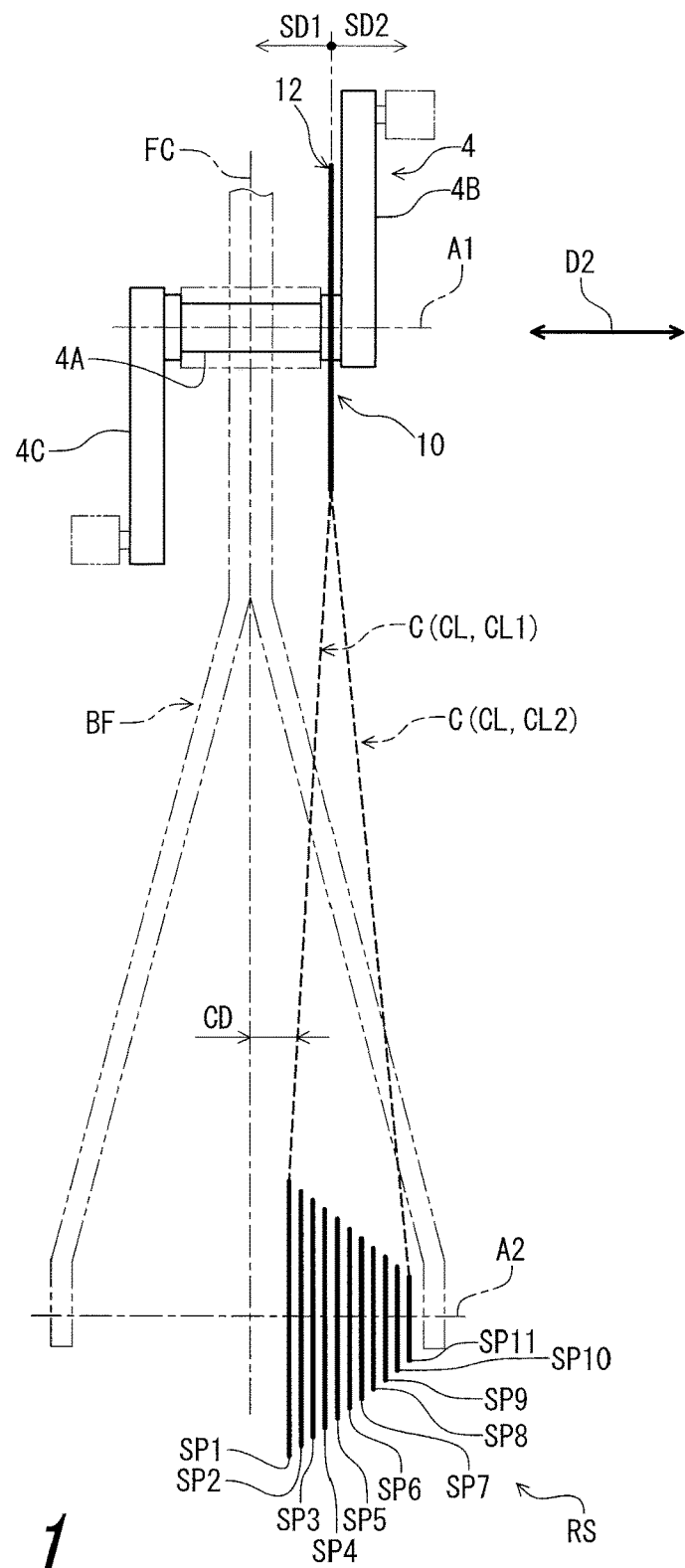
FIG. 1 is a schematic diagram of a bicycle drive train including a bicycle sprocket assembly in accordance with a first embodiment.

The embodiment(s) will now be described with reference to the accompanying drawings, wherein like reference numerals designate corresponding or identical elements throughout the various drawings.

First Embodiment

Referring initially to FIG. 1, a bicycle sprocket assembly 10 comprises a bicycle sprocket 12 in accordance with a first embodiment. The bicycle sprocket 12 has a rotational center axis A1. The bicycle sprocket 12 is rotatable about the rotational center axis A1 relative to a bicycle frame BF. A bicycle chain C extends between the bicycle sprocket 12 and a rear sprocket assembly RS including rear sprockets SP1 to SP11. The rear sprocket assembly RS is rotatable relative to the bicycle frame BF about a rotational center axis A2. In this embodiment, the bicycle sprocket 12 is a single sprocket without another sprocket in the bicycle sprocket assembly 10. However, the bicycle sprocket assembly 10 can comprise another sprocket in addition to the bicycle sprocket 12. The bicycle sprocket assembly 10 can comprises bicycle sprockets each having the same structure as that of the bicycle sprocket 12. Furthermore, the structure of the bicycle sprocket 12 can be applied to at least one of the rear sprockets SP1 to SP11 of the rear sprocket assembly RS.

Figure 2:
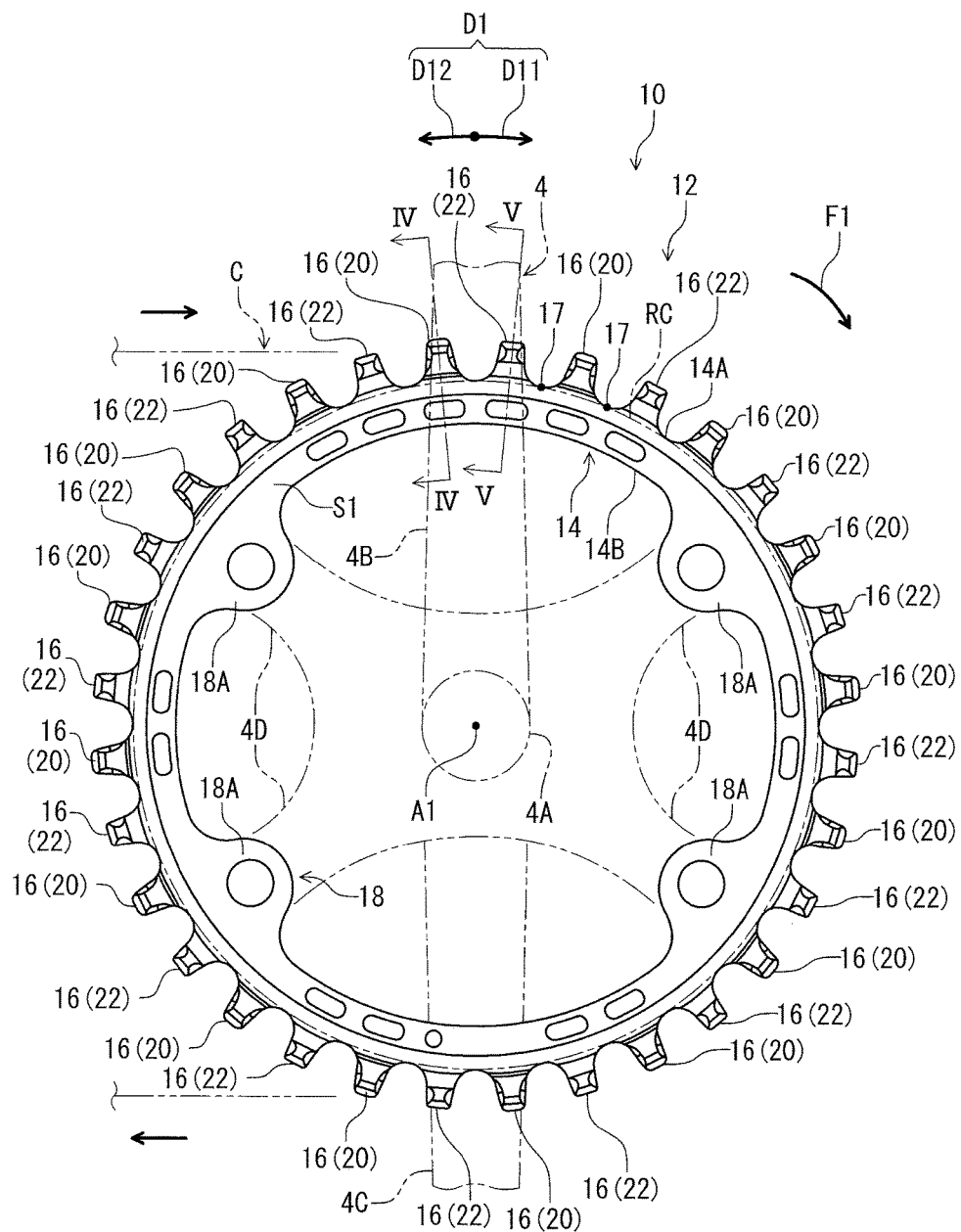
FIG. 2 is a side elevational view of the bicycle sprocket assembly illustrated in FIG. 1.

As seen in FIG. 2, the bicycle sprocket 12 is engaged with the bicycle chain C to transmit a rotational driving force F1 between the bicycle sprocket 12 and the bicycle chain C. The bicycle sprocket 12 is rotatable about the rotational center axis A1 in a driving rotational direction D11 during pedaling. A reversing rotational direction D12 is opposite to the driving rotational direction D11. The driving rotational direction D11 and the reversing rotational direction D12 are defined along a circumferential direction D1 of the bicycle sprocket 12. The circumferential direction D1 is defined about the rotational center axis A1 of the bicycle sprocket 12.

In the present application, the following directional terms "front," "rear," "forward," "rearward," "left," "right," "transverse," "upward" and "downward" as well as any other similar directional terms refer to those directions which are determined on the basis of a user (e.g., a rider) who sits on a saddle (not shown) of a bicycle with facing a handlebar (not shown). Accordingly, these terms, as utilized to describe the bicycle sprocket 12, should be interpreted relative to the bicycle equipped with the bicycle sprocket 12 as used in an upright riding position on a horizontal surface.

As seen in FIG. 2, the bicycle sprocket 12 comprises a sprocket body 14 and chain-driving teeth 16. The sprocket body 14 includes a radially outer periphery 14A provided about the rotational center axis A1 of the bicycle sprocket 12. The chain-driving teeth 16 are provided on the radially outer periphery 14A to engage with the bicycle chain C. The chain-driving teeth 16 comprises tooth bottoms 17 defining a root circle RC of the bicycle sprocket 12. The radially outer periphery 14A coincides with the root circle RC of the bicycle sprocket 12.

Figure 3:
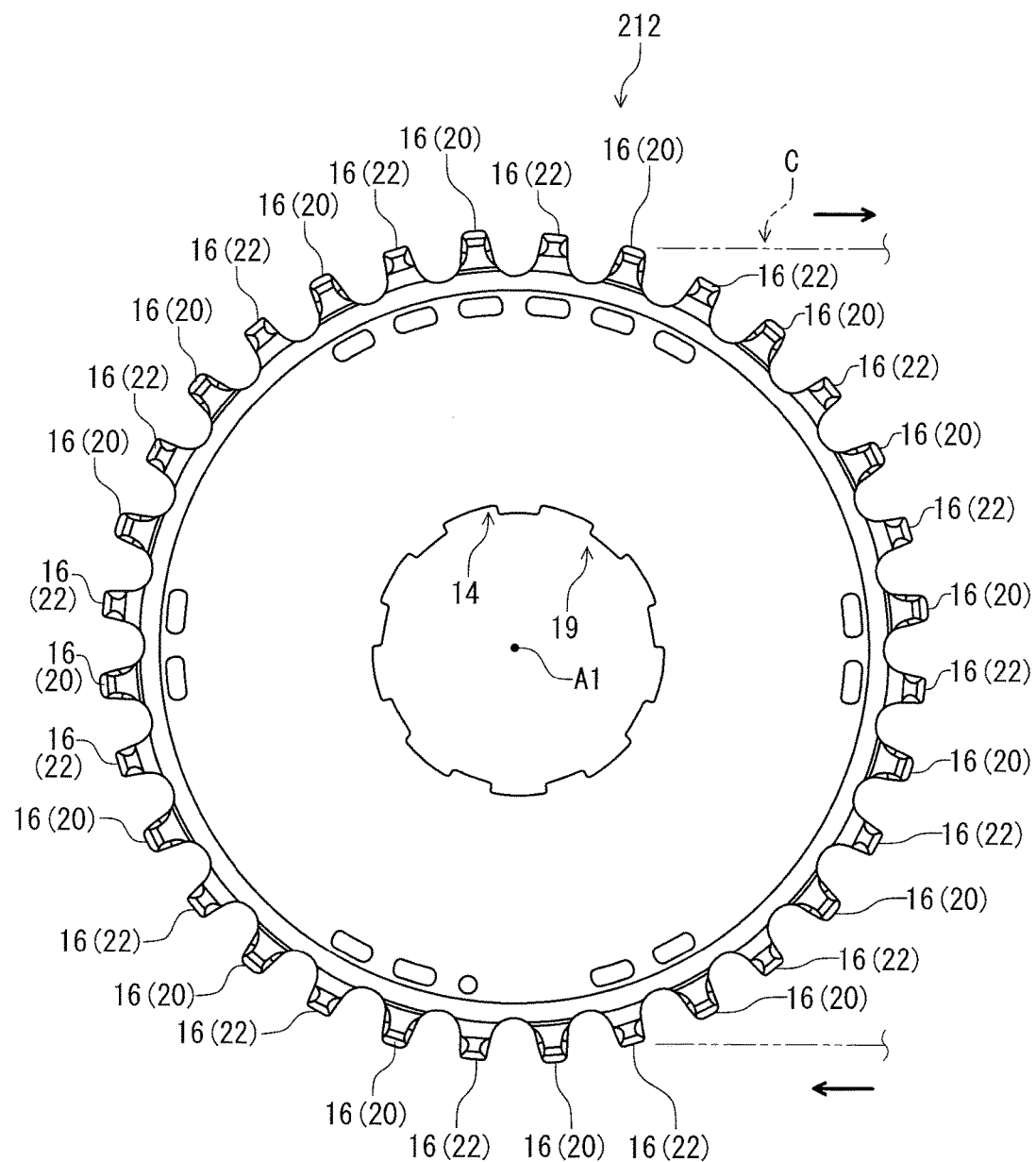
FIG. 3 is a side elevational view of a bicycle sprocket in accordance with a modification.

The bicycle sprocket 12 further comprises one of a crank arm attachment part and a hub assembly attachment part. In this embodiment, the bicycle sprocket 12 further comprises a crank arm attachment part 18. As seen in FIG. 3, however, the bicycle sprocket 12 can comprise a hub assembly attachment portion 19.

As seen in FIG. 2, the sprocket body 14 includes a radially inner periphery 14B provided about the rotational center axis A1. The crank arm attachment part 18 is provided on the radially inner periphery 14B to couple the sprocket body 14 to a bicycle crank 4. In this embodiment, the crank arm attachment part 18 includes crank attachment portions 18A extending radially inwardly from the radially inner periphery 14B of the sprocket body 14. The bicycle crank 4 includes a crank axle 4A, a right crank arm 4B, a left crank arm 4C, and connecting arms 4D. The crank connecting arms 4D are respectively fastened to the crank attachment portions 18A with fasteners such as bolts (not shown).

Figure 4:
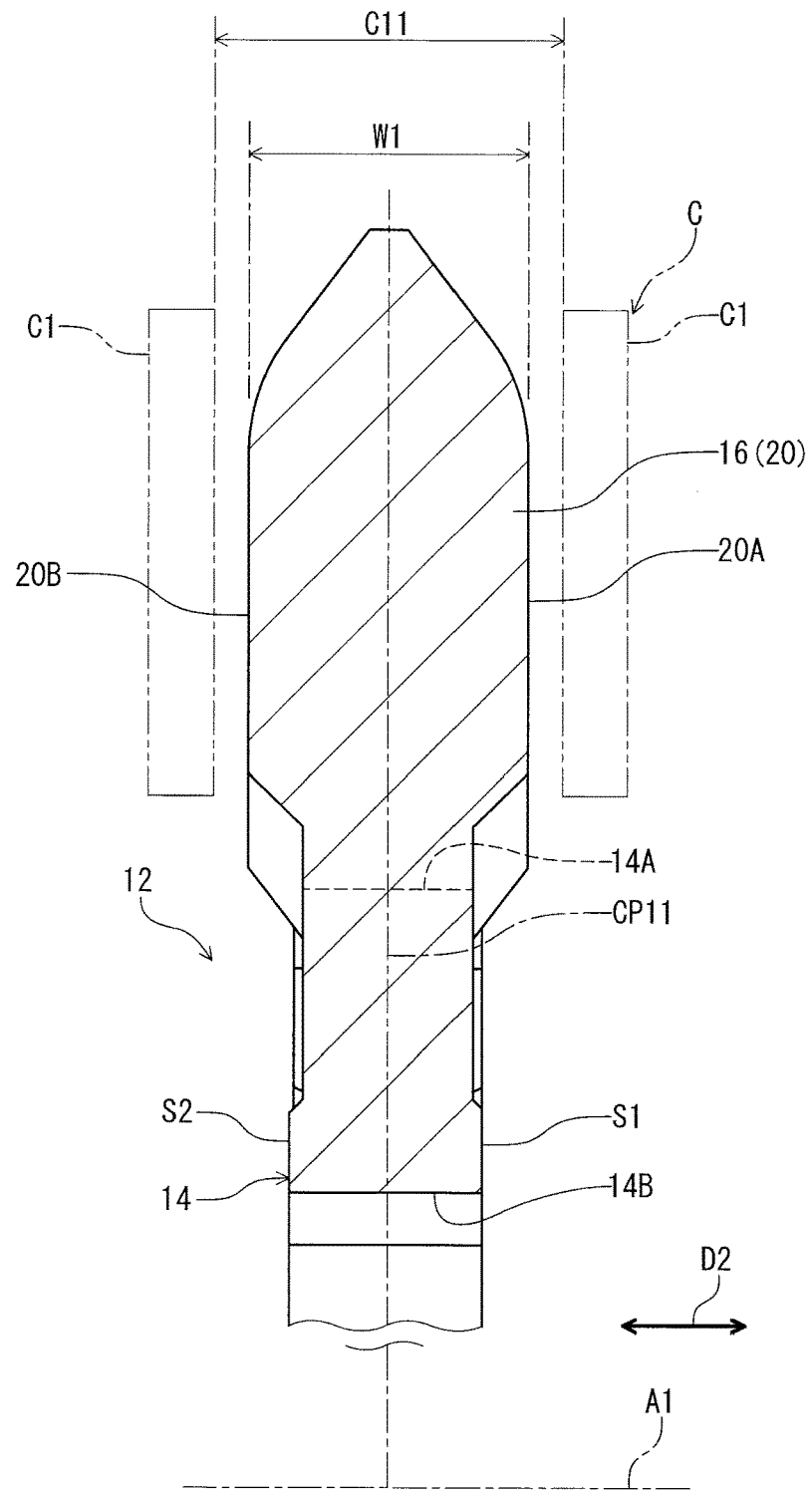
FIG. 4 is a cross-sectional view of the bicycle sprocket taken along line IV-IV of FIG. 2.
Figure 5:
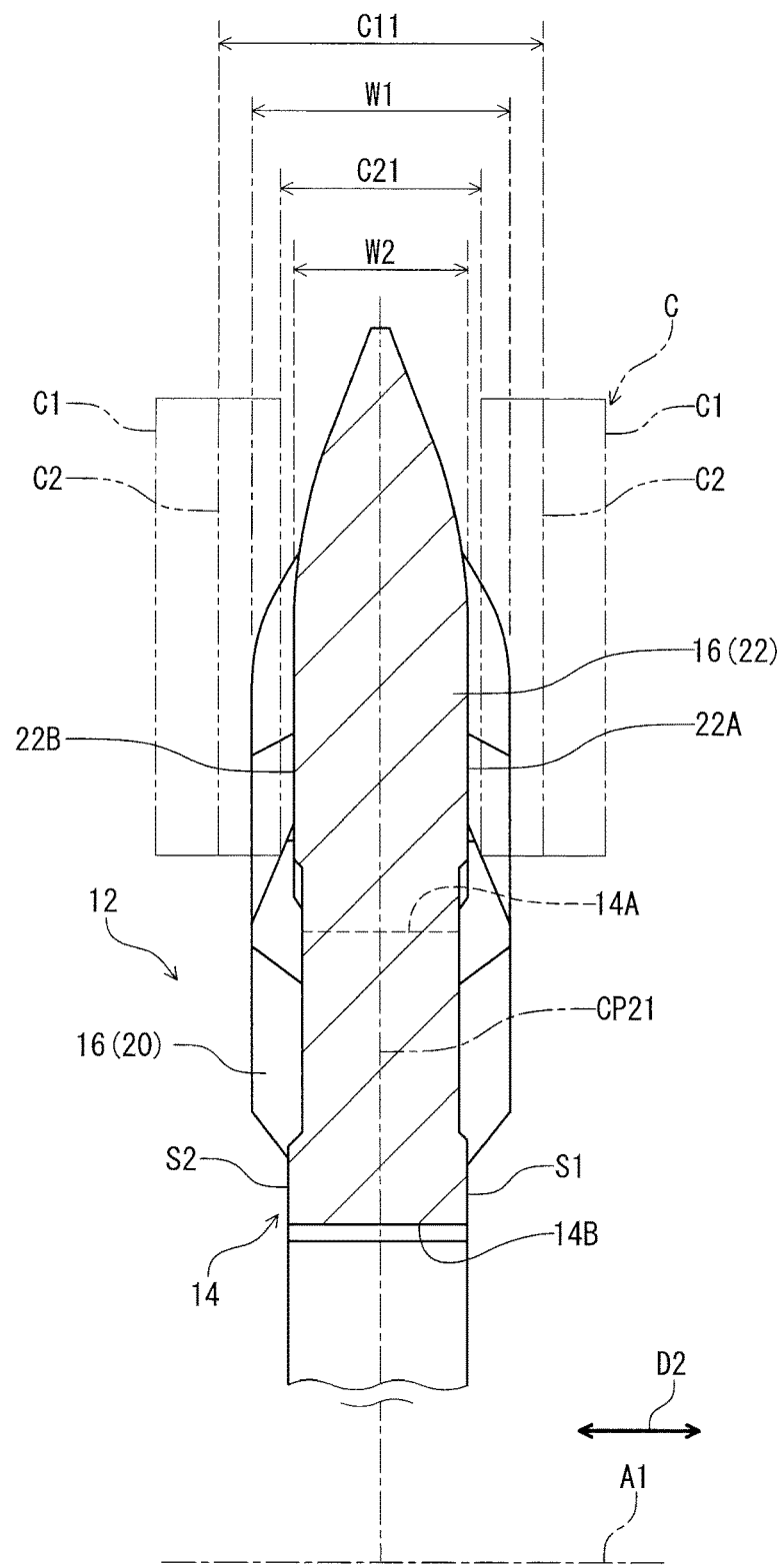
FIG. 5 is a cross-sectional view of the bicycle sprocket taken along line V-V of FIG. 2.

As seen in FIG. 2, the chain-driving teeth 16 comprises at least one first tooth 20 and at least one second tooth 22. As seen in FIG. 4, the at least one first tooth 20 is provided on the radially outer periphery 14A to engage with outer link plates C1 of the bicycle chain C. As seen in FIG. 5, the at least one second tooth 22 is provided on the radially outer periphery 14A to engage with inner link plates C2 of the bicycle chain C.

In this embodiment, as seen in FIG. 2, the at least one first tooth 20 includes first teeth 20. The at least one second tooth 22 includes second teeth 22. The first teeth 20 and the second teeth 22 are alternatingly arranged on the radially outer periphery 14A of the sprocket body 14 in the circumferential direction D1 defined about the rotational center axis A1. However, the arrangement of the first teeth 20 and the second teeth 22 is not limited to this embodiment.

A total number of the chain-driving teeth 16 is an even number. In this embodiment, the total number of the chain-driving teeth 16 is equal to or larger than thirteen. The total number of the chain-driving teeth 16 is equal to or larger than thirty. In the illustrated embodiment, the total number of the chain-driving teeth 16 is thirty-two. A total number of the first teeth 20 is equal to a total number of the second teeth 22. However, the total number of the chain-driving teeth 16, the total number of the first teeth 20, and the total number of the second teeth 22 are not limited to this embodiment. The chain-driving teeth 16 are made of a metallic material. However, the chain-driving teeth 16 can be made of a material other than the metallic material.

As seen in FIG. 4, the bicycle sprocket 12 comprises a first side surface S1 and a second side surface S2 opposite to the first side surface S1 in an axial direction D2 parallel to the rotational center axis A1. In this embodiment, the second side surface S2 is closer to the bicycle frame BF (FIG. 1) than the first side surface S1 in the axial direction D2. Thus, the first side surface S1 is an axially outer side surface, and the second side surface S2 is an axially inner side surface in a state where the bicycle sprocket assembly 10 is mounted to the bicycle frame BF (FIG. 1). However, the first side surface S1 can be closer to the bicycle frame BF (FIG. 1) than the second side surface S2 in the axial direction D2.

As seen in FIGS. 4 and 5, the chain-driving teeth 16 each have a first axial surface and a second axial surface. In this embodiment, as seen in FIG. 4, the first tooth 20 has a first axial surface 20A and a second axial surface 20B. The second axial surface 20B is opposite to the first axial surface 20A in the axial direction D2 parallel to the rotational center axis A1. As seen in FIG. 5, the second tooth 22 has a first axial surface 22A and a second axial surface 22B. The second axial surface 22B is opposite to the first axial surface 22A in the axial direction D2 parallel to the rotational center axis A1.

As seen in FIG. 4, the at least one first tooth 20 has a first maximum chain-engaging width W1 defined in the axial direction D2. The at least one first tooth 20 has an axial center plane CP11 defined to bisect the first maximum chain-engaging width W1 of the at least one first tooth 20 in the axial direction D2. The first axial surface 20A is contactable with one of an opposed pair of outer link plates C1. The second axial surface 20B is contactable with the other of the opposed pair of outer link plates C1. The first maximum chain-engaging width W1 is defined between the first axial surface 20A and the second axial surface 20B in the axial direction D2. The first axial surface 20A is provided on the first side surface S1, and the second axial surface 20B is provided on the second side surface S2.

As seen in FIG. 5, the at least one second tooth 22 has a second maximum chain-engaging width W2 defined in the axial direction D2. The at least one second tooth 22 has an axial center plane CP21 defined to bisect the second maximum chain-engaging width W2 of the at least one second tooth 22 in the axial direction D2. The second chain-engaging surface is contactable with one of an opposed pair of inner link plates C2. The second axial surface 22B is contactable with the other of the opposed pair of inner link plates C2. The second maximum chain-engaging width W2 is defined between the first axial surface 22A and the second axial surface 22B in the axial direction D2. The first axial surface 22A is provided on the first side surface S1, and the second axial surface 22B is provided on the second side surface S2.

As seen in FIG. 5, the first maximum chain-engaging width W1 is larger than the second maximum chain-engaging width W2. The first maximum chain-engaging width W1 is larger than an inner link space C21 defined between the opposed pair of inner link plates C2 of the bicycle chain C in the axial direction D2 and smaller than an outer link space C11 defined between the opposed pair of outer link plates C1 of the bicycle chain C in the axial direction D2. The second maximum chain-engaging width W2 is smaller than the inner link space C21. However, the first maximum chain-engaging width W1 can be smaller than the inner link space C21.

The at least one first tooth 20 has a first axial percentage of the first maximum chain-engaging width W1 in the outer link space C11 defined between the opposed pair of outer link plates C1 of the bicycle chain C in the axial direction D2. The at least one second tooth 22 has a second axial percentage of the second maximum chain-engaging width W2 in the inner link space C21 defined between the opposed pair of inner link plates C2 of the bicycle chain in the axial direction D2. The first axial percentage is smaller than the second axial percentage. The first axial percentage is equal to or smaller than 80%. The second axial percentage is equal to or larger than 80%. In this embodiment, the first axial percentage is equal to 76%. The second axial percentage is equal to 86%. However, the first axial percentage and the second axial percentage are not limited to this embodiment.

Figure 6:
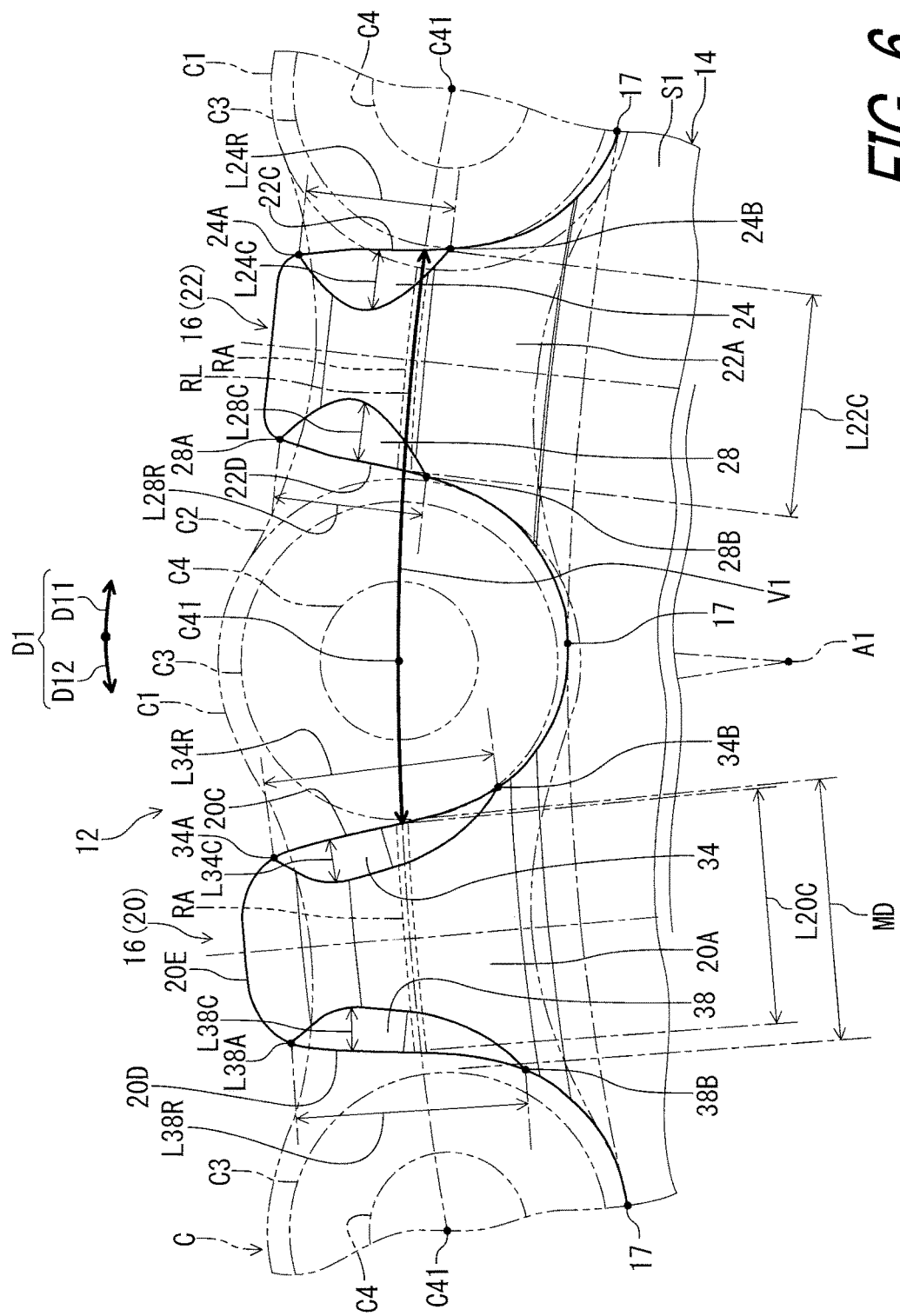
FIG. 6 is a partial side elevational view of the bicycle sprocket illustrated in FIG. 2, with a bicycle chain engaged with the bicycle sprocket.

As seen in FIG. 6, the chain-driving teeth 16 each have a driving surface and a non-driving surface. In this embodiment, the first teeth 20 each have a first driving surface 20C facing in the driving rotational direction D11 in which the bicycle sprocket 12 is rotated during pedaling. The second teeth 22 each have a second driving surface 22C facing in the driving rotational direction D11. The first driving surfaces 20C of the first teeth 20 and the second driving surfaces 22C of the second teeth 22 are alternatingly arranged in the circumferential direction D1 at regular (constant) intervals. In a pair of the first tooth 20 and the second tooth 22 which are adjacent to each other without another tooth therebetween, for example, an interval V1 is defined between the first driving surfaces 20C of the first teeth 20 and the second driving surfaces 22C of the second teeth 22 along a reference line RL in the circumferential direction D1. The intervals V1 are equal among pairs of the first tooth 20 and the second tooth 22. The interval V1 can be defined regardless of the reference line RL. For example, the interval V1 can be defined between a point at which the first driving surfaces 20C contacts the roller C3 and a point at which the second driving surfaces 22C contacts the roller C3. The first driving surface 20C can also be referred to as a driving surface 20C. The second driving surface 22C can also be referred to as a driving surface 22C.

The first tooth 20 has the driving surface 20C and a non-driving surface 20D. The second tooth 22 has the driving surface 22C and a non-driving surface 22D. The driving surface 20C faces in the driving rotational direction D11 in which the bicycle sprocket 12 is rotated during pedaling. The non-driving surface 20D is opposite to the driving surface 20C in the circumferential direction D1 defined about the rotational center axis A1. The driving surface 20C faces in the driving rotational direction D11 to contact a roller C3 of the bicycle chain C during pedaling. The non-driving surface 20D faces in the reversing rotational direction D12. The driving surface 22C faces in the driving rotational direction D11 in which the bicycle sprocket 12 is rotated during pedaling. The non-driving surface 22D is opposite to the driving surface 22C in the circumferential direction D1 defined about the rotational center axis A1. The driving surface 22C faces in the driving rotational direction D11 to contact the roller C3 of the bicycle chain C during pedaling. The non-driving surface 22D faces in the reversing rotational direction D12.

The at least one first tooth 20 has a first circumferential tooth-length L20C defined in the circumferential direction D1 at a radial location defined in vicinity of the reference line RL. The reference line RL is defined to connect centers C41 of neighboring pins C4 of the bicycle chain C engaged with the chain-driving teeth 16 when viewed from the axial direction D2. Namely, the reference line RL constitutes a pitch circle of the bicycle sprocket 12. The at least one second tooth 22 has a second circumferential tooth-length L22C defined in the circumferential direction D1 at the radial location. The first circumferential tooth-length L20C is larger than the second circumferential tooth-length L22C. A dimensional difference between the first circumferential tooth-length L20C and the second circumferential tooth-length L22C is equal to or smaller than 1 mm. The dimensional difference is preferably equal to or smaller than 0.5 mm. The dimensional difference is more preferably equal to or smaller than 0.2 mm. In this embodiment, the dimensional difference is equal to 0.15 mm. However, the dimensional difference is not limited to this embodiment.

The radial location defined in vicinity of the reference line RL includes a radial area RA. The radial area RA is defined radially outwardly from the reference line RL by 1 mm and defined radially inwardly from the reference line RL by 1 mm, for example. The radial location is preferably defined on the reference line RL. The at least one first tooth 20 includes a first tooth tip 20E. The first circumferential tooth-length L20C is defined at a first radial center position defined between the first tooth tip 20E and the root circle RC. The at least one second tooth 22 includes a second tooth tip 22E. The second circumferential tooth-length L22C is defined at a second radial center position defined between the second tooth tip 22E and the root circle RC. However, the radial location is not limited to this embodiment. The first circumferential tooth-length L20C defined at the first radial center position and the first circumferential tooth-length L20C defined at the radial location defined in vicinity of the reference line RL can be different from each other. Further, the second circumferential tooth-length L22C defined at the second radial center position and the second circumferential tooth-length L22C defined at the radial location defined in vicinity of the reference line RL can be different from each other. The first tooth tip 20E can also be referred to as a tooth tip 20E. The second tooth tip 22E can also be referred to as a tooth tip 22E.

The at least one first tooth 20 has a first circumferential percentage of the first circumferential tooth-length L20C in a minimum circumferential distance MD defined between neighboring rollers C3 of the bicycle chain C in the circumferential direction D1. The at least one second tooth 22 has a second circumferential percentage of the second circumferential tooth-length L22C in the minimum circumferential distance MD. The first circumferential percentage is larger than the second circumferential percentage. The first circumferential percentage is equal to or larger than 90%. The first circumferential percentage is preferably equal to or larger than 92%. The second circumferential percentage is equal to or smaller than 92%. In this embodiment, the first circumferential percentage is equal to 93%. However, the first circumferential percentage and the second circumferential percentage are not limited to this embodiment.

Figure 7:
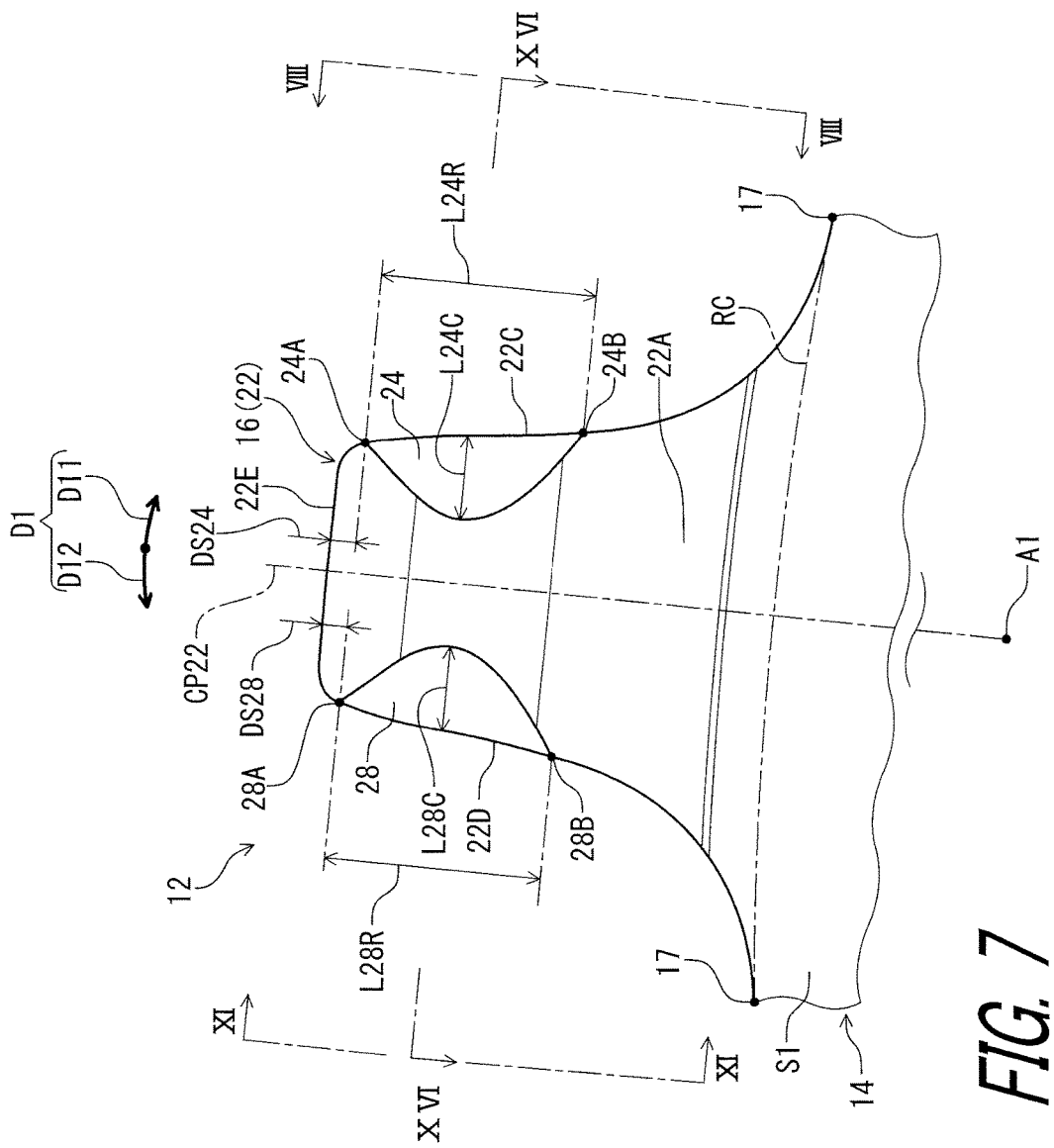
FIG. 7 is an enlarged partial side elevational view of a second tooth of the bicycle sprocket illustrated in FIG. 2.

As seen in FIG. 7, the at least one second tooth 22 includes a first chamfer 24 provided between the first axial surface 22A of the at least one second tooth 22 and the driving surface 22C of the at least one second tooth 22. The first chamfer 24 has a first radially outer end 24A and a first radially inner end 24B and radially extends between the first radially outer end 24A and the first radially inner end 24B. The first radially outer end 24A is closer to the tooth tip 22E of the at least one second tooth 22 than the first radially inner end 24B. The first radially outer end 24A is disposed radially inwardly of the tooth tip 22E of the at least one second tooth 22. The first radially inner end 24B is disposed radially inwardly of the first radially outer end 24A. A distance DS24 defined between the first radially outer end 24A and the tooth tip 22E is 0.3 mm, for example.

The first chamfer 24 has a maximum circumferential chamfered-length L24C defined in the circumferential direction D1 at a radial position defined between the first radially outer end 24A and the first radially inner end 24B. In this embodiment, the maximum circumferential chamfered-length L24C is equal to or larger than 0.8 mm. The maximum circumferential chamfered-length L24C is preferably equal to or larger than 1 mm. The maximum circumferential chamfered-length L24C is preferably equal to or smaller than 1.5 mm. In this embodiment, the maximum circumferential chamfered-length L24C is equal to 1.32 mm. However, the maximum circumferential chamfered-length L24C is not limited to this embodiment.

The first chamfer 24 has a maximum radial chamfered-length L24R defined between the first radially outer end 24A and the first radially inner end 24B. The maximum radial chamfered-length L24R is larger than the maximum circumferential chamfered-length L24C. The maximum radial chamfered-length L24R is preferably equal to or smaller than 4 mm. The maximum radial chamfered-length L24R is more preferably equal to or smaller than 3.5 mm. In this embodiment, the maximum radial chamfered-length L24R is equal to 3.34 mm. However, the maximum radial chamfered-length L24R is not limited to this embodiment.

Figure 8:
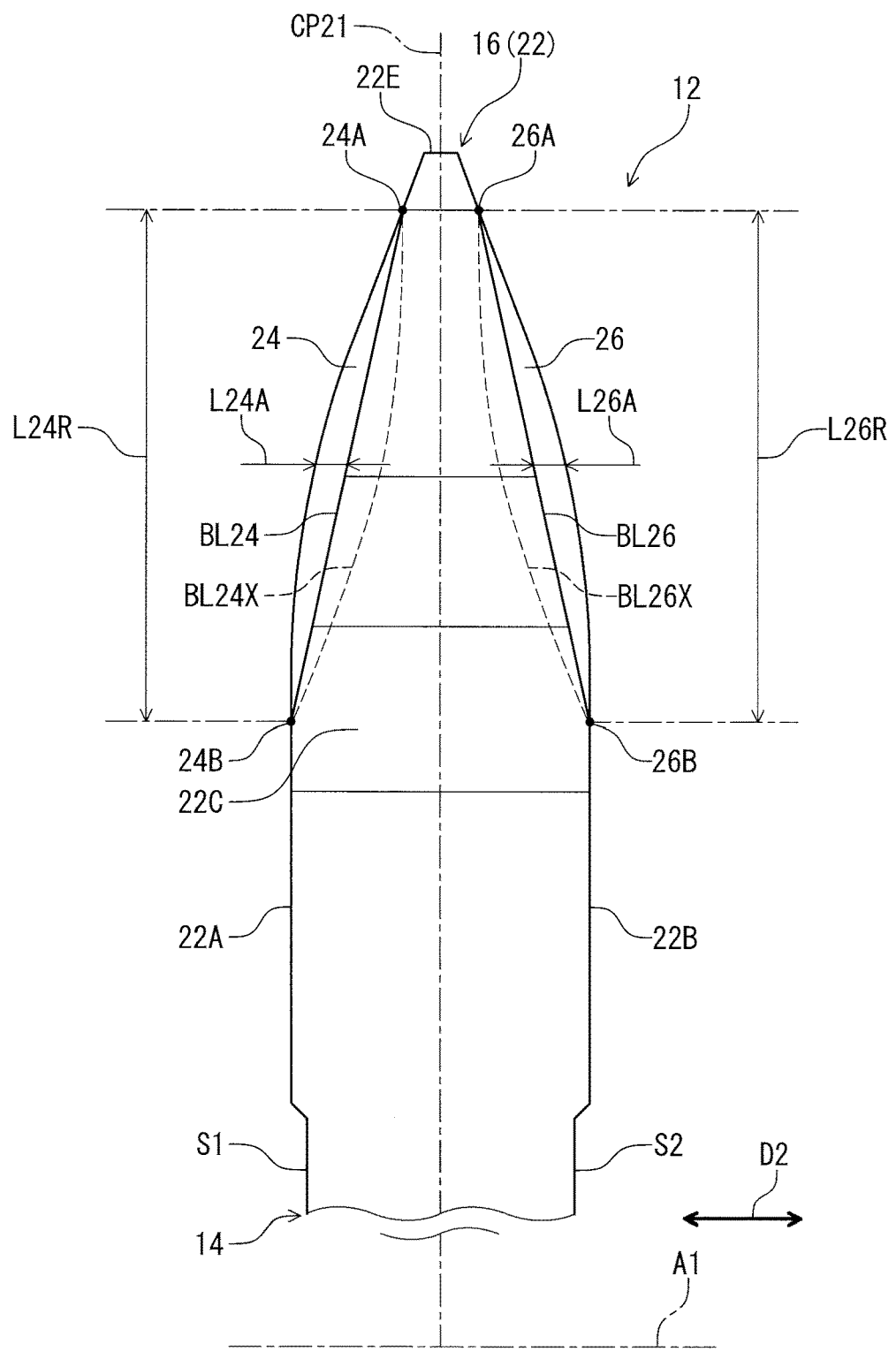
FIG. 8 is an arrow view of the second tooth of the bicycle sprocket taken in a direction of arrow VIII in FIG. 7.

As seen in FIG. 8, the first chamfer 24 has a maximum axial chamfered-length L24A defined in the axial direction D2. The maximum axial chamfered-length L24A is smaller than the maximum radial chamfered-length L24R. As seen in FIGS. 7 and 8, the maximum axial chamfered-length L24A is smaller than the maximum circumferential chamfered-length L24C.

As seen in FIG. 8, the at least one second tooth 22 has a border line BL24 defined between the driving surface 22C of the at least one second tooth 22 and the first chamfer 24 of the at least one second tooth 22. The border line BL24 includes a straight line when viewed from the circumferential direction D1. The border line BL24 linearly extends from the first radially outer end 24A to the first radially inner end 24B when viewed from the circumferential direction D1. As indicated with a broken line BL24X in FIG. 8, however, the border line BL24 can at least partly include a curved line when viewed from the circumferential direction D1. For example, the border line BL24 can have a curved shape protruding toward the second axial surface 22B or toward the axial center plane CP21 when viewed from the circumferential direction D1.

As seen in FIG. 6, the maximum circumferential chamfered-length L24C is defined in the circumferential direction D1 at a radial position defined between the tooth tip 22E of the at least one second tooth 22 and the reference line RL. The first radially inner end 24B is disposed radially inwardly of the reference line RL.

Figure 9:
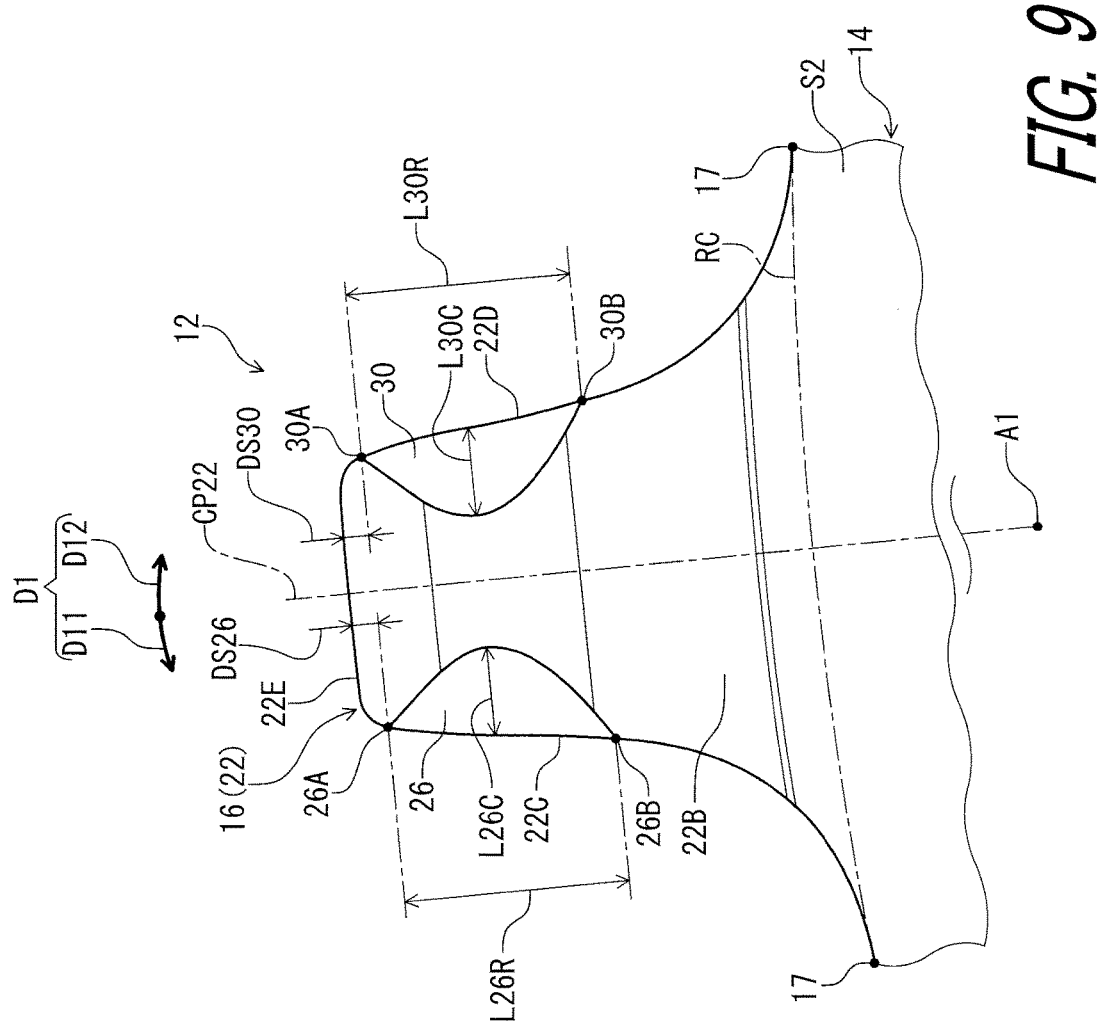
FIG. 9 is another enlarged partial side elevational view of the second tooth of the bicycle sprocket illustrated in FIG. 2.

As seen in FIG. 9, the at least one second tooth 22 includes a second chamfer 26 provided between the second axial surface 22B of the at least one second tooth 22 and the driving surface 22C of the at least one second tooth 22. The second chamfer 26 has a second radially outer end 26A and a second radially inner end 26B and radially extends between the second radially outer end 26A and the second radially inner end 26B. The second radially outer end 26A is closer to the tooth tip 22E of the at least one second tooth 22 than the second radially inner end 26B. The second radially outer end 26A is disposed radially inwardly of the tooth tip 22E of the at least one second tooth 22. The second radially inner end 26B is disposed radially inwardly of the second radially outer end 26A. A distance DS26 defined between the second radially outer end 26A and the tooth tip 22E is 0.3 mm, for example.

The second chamfer 26 has a maximum circumferential chamfered-length L26C defined in the circumferential direction D1 at a radial position defined between the second radially outer end 26A and the second radially inner end 26B. In this embodiment, the maximum circumferential chamfered-length L26C is equal to or larger than 0.8 mm. The maximum circumferential chamfered-length L26C is preferably equal to or larger than 1 mm. The maximum circumferential chamfered-length L26C is preferably equal to or smaller than 1.5 mm. In this embodiment, the maximum circumferential chamfered-length L26C is equal to 1.32 mm. However, the maximum circumferential chamfered-length L26C is not limited to this embodiment.

The second chamfer 26 has a maximum radial chamfered-length L26R defined between the second radially outer end 26A and the second radially inner end 26B. The maximum radial chamfered-length L26R is larger than the maximum circumferential chamfered-length L26C. The maximum radial chamfered-length L26R is preferably equal to or smaller than 4 mm. The maximum radial chamfered-length L26R is more preferably equal to or smaller than 3.5 mm. In this embodiment, the maximum radial chamfered-length L26R is equal to 3.34 mm. However, the maximum radial chamfered-length L26R is not limited to this embodiment.

As seen in FIG. 8, the second chamfer 26 has a maximum axial chamfered-length L26A defined in the axial direction D2. The maximum axial chamfered-length L26A is smaller than the maximum radial chamfered-length L26R. As seen in FIGS. 8 and 9, the maximum axial chamfered-length L26A is smaller than the maximum circumferential chamfered-length L26C.

As seen in FIG. 8, the at least one second tooth 22 has a border line BL26 defined between the driving surface 22C of the at least one second tooth 22 and the second chamfer 26 of the at least one second tooth 22. The border line BL26 includes a straight line when viewed from the circumferential direction D1. The border line BL26 linearly extends from the second radially outer end 26A to the second radially inner end 26B when viewed from the circumferential direction D1. As indicated with a broken line BL26X in FIG. 8, however, the border line BL26 can at least partly include a curved line when viewed from the circumferential direction D1. For example, the border line BL26 can have a curved shape protruding toward the first axial surface 22A when viewed from the circumferential direction D1.

Figure 10:
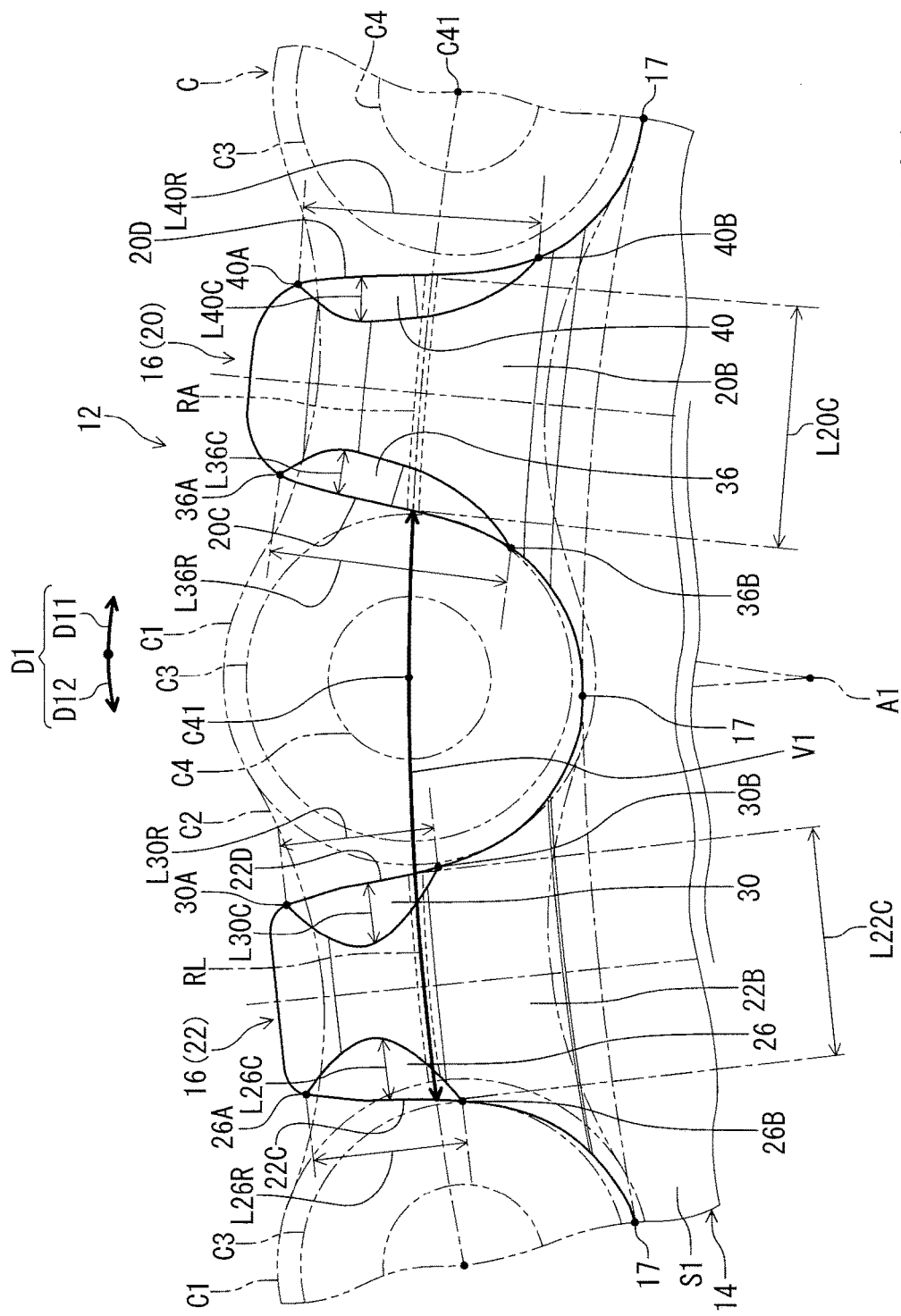
FIG. 10 is another partial side elevational view of the bicycle sprocket illustrated in FIG. 2, with the bicycle chain engaged with the bicycle sprocket.

As seen in FIG. 10, the maximum circumferential chamfered-length L26C is defined in the circumferential direction D1 at a radial position defined between the tooth tip 22E of the at least one second tooth 22 and the reference line RL. The second radially inner end 26B is disposed radially inwardly of the reference line RL.

As seen in FIG. 7, the at least one second tooth 22 includes a third chamfer 28 provided between the first axial surface 22A of the at least one second tooth 22 and the non-driving surface 22D of the at least one second tooth 22. The third chamfer 28 has a third radially outer end 28A and a third radially inner end 28B and radially extends between the third radially outer end 28A and the third radially inner end 28B. The third radially outer end 28A is closer to the tooth tip 22E of the at least one second tooth 22 than the third radially inner end 28B. The third radially outer end 28A is disposed radially inwardly of the tooth tip 22E of the at least one second tooth 22. The third radially inner end 28B is disposed radially inwardly of the third radially outer end 28A. A distance DS28 defined between the third radially outer end 28A and the tooth tip 22E is 0.3 mm, for example.

The third chamfer 28 has a maximum circumferential chamfered-length L28C defined in the circumferential direction D1 at a radial position defined between the third radially outer end 28A and the third radially inner end 28B. In this embodiment, the maximum circumferential chamfered-length L28C is equal to or larger than 0.8 mm. The maximum circumferential chamfered-length L28C is preferably equal to or larger than 1 mm. The maximum circumferential chamfered-length L28C is preferably equal to or smaller than 1.5 mm. In this embodiment, the maximum circumferential chamfered-length L28C is equal to 1.32 mm. However, the maximum circumferential chamfered-length L28C is not limited to this embodiment.

The third chamfer 28 has a maximum radial chamfered-length L28R defined between the third radially outer end 28A and the third radially inner end 28B. The maximum radial chamfered-length L28R is larger than the maximum circumferential chamfered-length L28C. The maximum radial chamfered-length L28R is preferably equal to or smaller than 4 mm. The maximum radial chamfered-length L28R is more preferably equal to or smaller than 3.5 mm. In this embodiment, the maximum radial chamfered-length L28R is equal to 3.34 mm. However, the maximum radial chamfered-length L28R is not limited to this embodiment.

Figure 11:
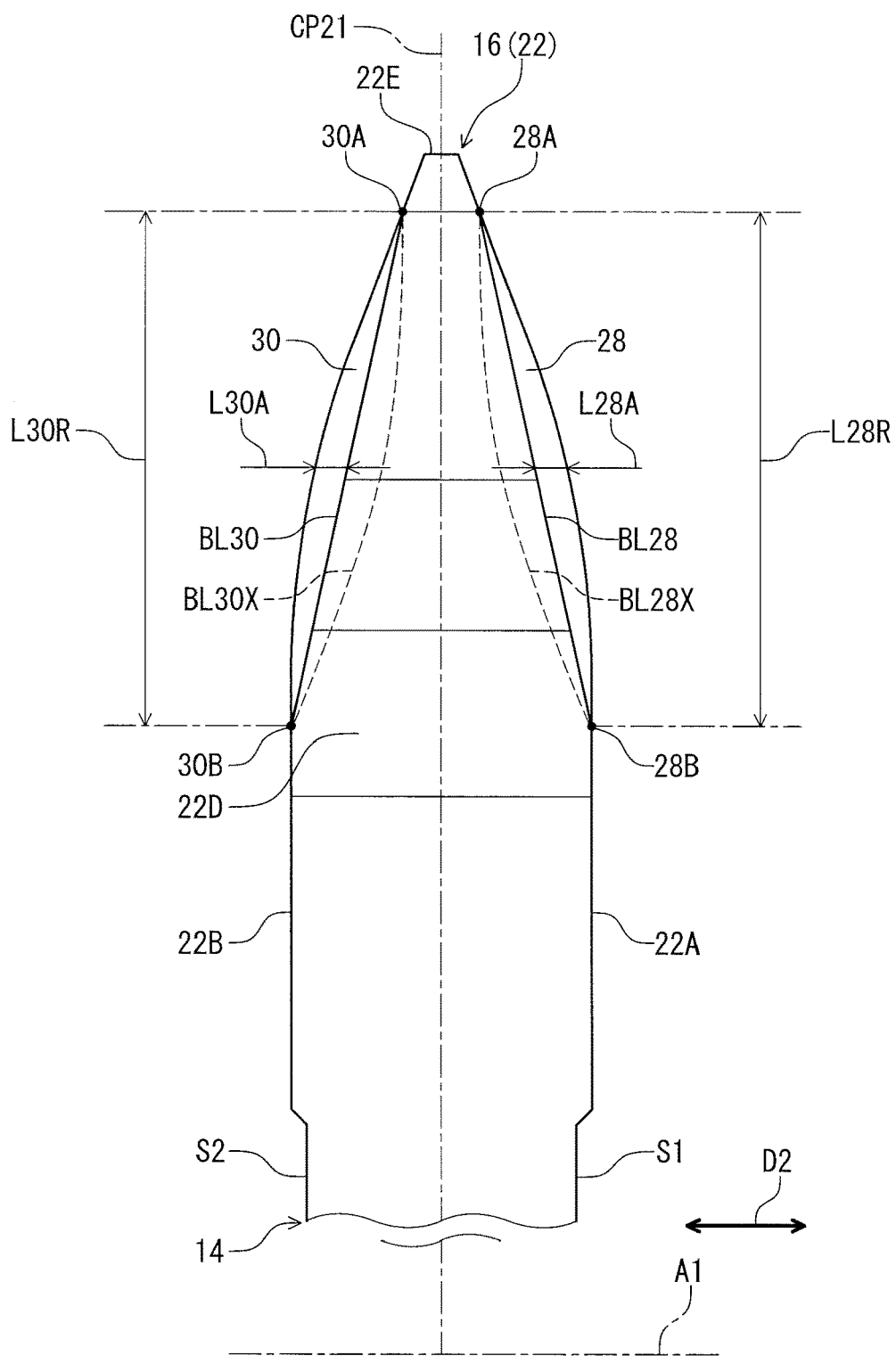
FIG. 11 is an arrow view of the second tooth of the bicycle sprocket taken in a direction of arrow XI in FIG. 7.

As seen in FIG. 11, the third chamfer 28 has a maximum axial chamfered-length L28A defined in the axial direction D2. The maximum axial chamfered-length L28A is smaller than the maximum radial chamfered-length L28R. As seen in FIGS. 7 and 11, the maximum axial chamfered-length L28A is smaller than the maximum circumferential chamfered-length L28C.

As seen in FIG. 11, the at least one second tooth 22 has a border line BL28 defined between the non-driving surface 22D of the at least one second tooth 22 and the third chamfer 28 of the at least one second tooth 22. The border line BL28 includes a straight line when viewed from the circumferential direction D1. The border line BL28 linearly extends from the third radially outer end 28A to the third radially inner end 28B when viewed from the circumferential direction D1. The border line BL28 includes a curved line when viewed from the circumferential direction D1. As indicated with a broken line BL28X in FIG. 11, however, the border line BL28 can at least partly include a curved line when viewed from the circumferential direction D1. For example, the border line BL28 can have a curved shape protruding toward the second axial surface 22B when viewed from the circumferential direction D1.

As seen in FIG. 6, the maximum circumferential chamfered-length L28C is defined in the circumferential direction D1 at a radial position defined between the tooth tip 22E of the at least one second tooth 22 and the reference line RL. The third radially inner end 28B is disposed radially inwardly of the reference line RL.

As seen in FIG. 9, the at least one second tooth 22 includes a fourth chamfer 30 provided between the second axial surface 22B of the at least one second tooth 22 and the non-driving surface 22D of the at least one second tooth 22. The fourth chamfer 30 has a fourth radially outer end 30A and a fourth radially inner end 30B and radially extends between the fourth radially outer end 30A and the fourth radially inner end 30B. The fourth radially outer end 30A is closer to the tooth tip 22E of the at least one second tooth 22 than the fourth radially inner end 30B. The fourth radially outer end 30A is disposed radially inwardly of the tooth tip 22E of the at least one second tooth 22. The fourth radially inner end 30B is disposed radially inwardly of the fourth radially outer end 30A. A distance DS30 defined between the fourth radially outer end 30A and the tooth tip 22E is 0.3 mm, for example.

The fourth chamfer 30 has a maximum circumferential chamfered-length L30C defined in the circumferential direction D1 at a radial position defined between the fourth radially outer end 30A and the fourth radially inner end 30B. In this embodiment, the maximum circumferential chamfered-length L30C is equal to or larger than 0.8 mm. The maximum circumferential chamfered-length L30C is preferably equal to or larger than 1 mm. The maximum circumferential chamfered-length L30C is preferably equal to or smaller than 1.5 mm. In this embodiment, the maximum circumferential chamfered-length L30C is equal to 1.32 mm. However, the maximum circumferential chamfered-length L30C is not limited to this embodiment.

The fourth chamfer 30 has a maximum radial chamfered-length L30R defined between the fourth radially outer end 30A and the fourth radially inner end 30B. The maximum radial chamfered-length L30R is larger than the maximum circumferential chamfered-length L30C. The maximum radial chamfered-length L30R is preferably equal to or smaller than 4 mm. The maximum radial chamfered-length L30R is more preferably equal to or smaller than 3.5 mm. In this embodiment, the maximum radial chamfered-length L30R is equal to 3.34 mm. However, the maximum radial chamfered-length L30R is not limited to this embodiment.

As seen in FIG. 11, the fourth chamfer 30 has a maximum axial chamfered-length L30A defined in the axial direction D2. The maximum axial chamfered-length L30A is smaller than the maximum radial chamfered-length L30R. As seen in FIGS. 9 and 11, the maximum axial chamfered-length L30A is smaller than the maximum circumferential chamfered-length L30C.

As seen in FIG. 11, the at least one second tooth 22 has a border line BL30 defined between the non-driving surface 22D of the at least one second tooth 22 and the fourth chamfer 30 of the at least one second tooth 22. The border line BL30 includes a straight line when viewed from the circumferential direction D1. The border line BL30 linearly extends from the fourth radially outer end 30A to the fourth radially inner end 30B when viewed from the circumferential direction D1. The border line BL30 includes a curved line when viewed from the circumferential direction D1. As indicated with a broken line BL30X in FIG. 8, however, the border line BL30 can at least partly include a curved line when viewed from the circumferential direction D1. For example, the border line BL30 can have a curved shape protruding toward the first axial surface 22A when viewed from the circumferential direction D1.

As seen in FIG. 10, the maximum circumferential chamfered-length L30C is defined in the circumferential direction D1 at a radial position defined between the tooth tip 22E of the at least one second tooth 22 and the reference line RL. The fourth radially inner end 30B is disposed radially inwardly of the reference line RL.

As seen in FIG. 8, the first chamfer 24 and the second chamfer 26 are symmetrical with respect to the axial center plane CP21. As seen in FIG. 11, the third chamfer 28 and the fourth chamfer 30 are symmetrical with respect to the axial center plane CP21. As seen in FIGS. 7 and 9, the second tooth 22 has a circumferential center plane CP22 defined to extend radially outwardly from the rotational center axis A1. As seen in FIG. 7, the first chamfer 24 and the third chamfer 28 are symmetrical with respect to the circumferential center plane CP22.

As seen in FIG. 9, the second chamfer 26 and the fourth chamfer 30 are symmetrical with respect to the circumferential center plane CP22. However, the first chamfer 24 and the second chamfer 26 can be asymmetrical with respect to the axial center plane CP21. In such an embodiment, the maximum radial chamfered-length L24R of the first chamfer 24 is preferably larger than the maximum radial chamfered-length L26R of the second chamfer 26. This smoothly inserts the second tooth 22 into the inner link space C21 of the inner link plates C2 in a state where the bicycle chain C extends along a second chain line CL2 (FIG. 1). Furthermore, the maximum circumferential chamfered-length L24C of the first chamfer 24 is preferably larger than the maximum circumferential chamfered-length L26C of the second chamfer 26. This smoothly inserts the second tooth 22 into the inner link space C21 of the inner link plates C2 in the state where the bicycle chain C extends along the second chain line CL2 (FIG. 1). One of the first chamfer 24 and the second chamfer 26 can be omitted from the second tooth 22. In such an embodiment, the second tooth 22 preferably includes the first chamfer 24.

The third chamfer 28 and the fourth chamfer 30 can be asymmetrical with respect to the axial center plane CP21. The first chamfer 24 and the third chamfer 28 can be asymmetrical with respect to the circumferential center plane CP22. At least one of the third chamfer 28 and the fourth chamfer 30 can be omitted from the second tooth 22. Namely, a chamfer can be provided only between the first axial surface 22A and the driving surface 22C and between the second axial surface 22B and the driving surface 22C. The second chamfer 26 and the fourth chamfer 30 can be asymmetrical with respect to the circumferential center plane CP22.

Figure 12:
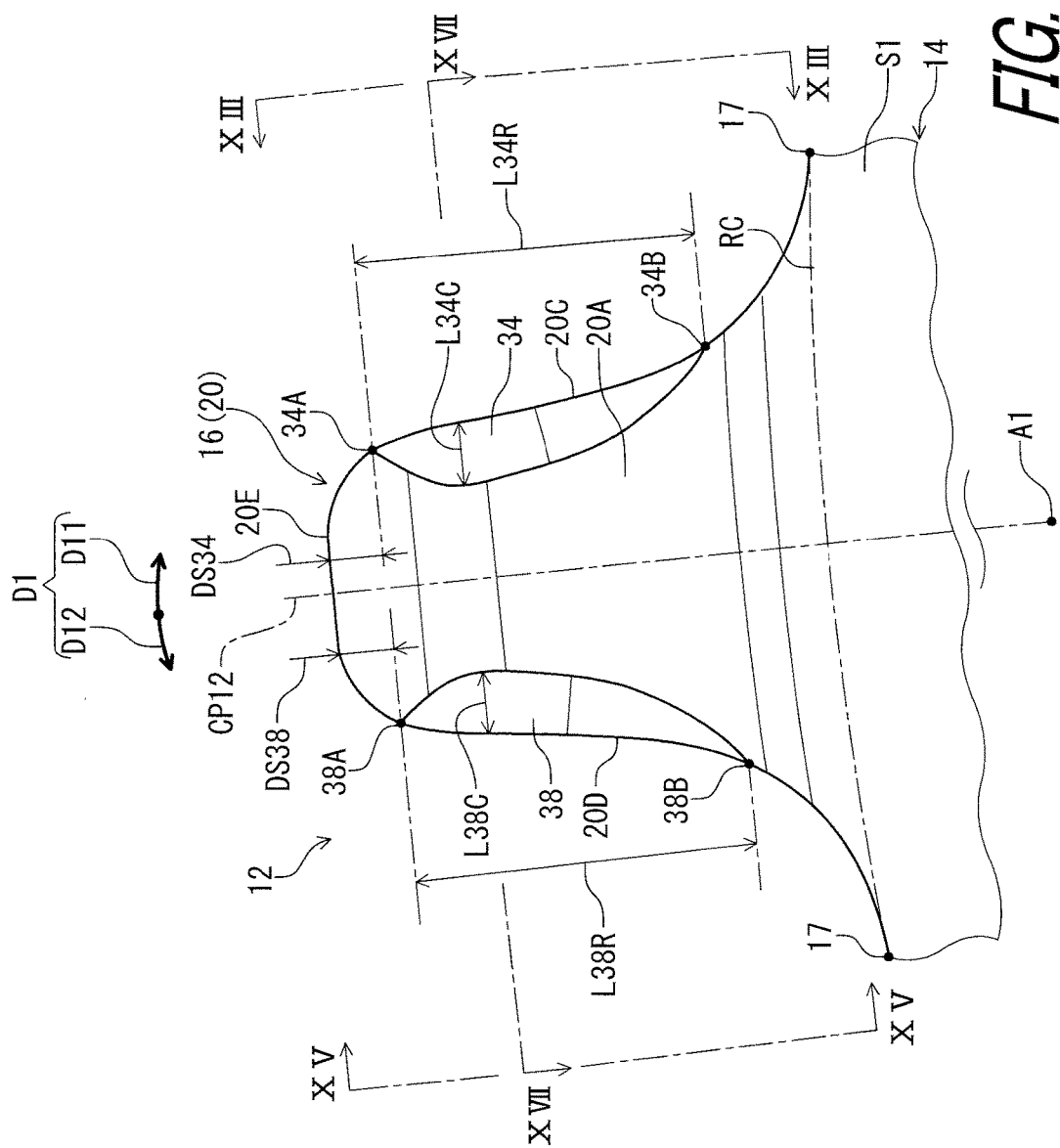
FIG. 12 is an enlarged partial side elevational view of a first tooth of the bicycle sprocket illustrated in FIG. 2.

As seen in FIG. 12, the at least one first tooth 20 includes a fifth chamfer 34 provided between the first axial surface 20A of the at least one first tooth 20 and the driving surface 20C of the at least one first tooth 20. The fifth chamfer 34 has a fifth radially outer end 34A and a fifth radially inner end 34B and radially extends between the fifth radially outer end 34A and the fifth radially inner end 34B. The fifth radially outer end 34A is closer to the tooth tip 20E of the at least one first tooth 20 than the fifth radially inner end 34B. The fifth radially outer end 34A is disposed radially inwardly of the tooth tip 20E of the at least one first tooth 20. The fifth radially inner end 34B is disposed radially inwardly of the fifth radially outer end 34A. A distance DS34 defined between the fifth radially outer end 34A and the tooth tip 20E is 0.7 mm, for example.

The fifth chamfer 34 has a maximum circumferential chamfered-length L34C defined in the circumferential direction D1 at a radial position defined between the fifth radially outer end 34A and the fifth radially inner end 34B. In this embodiment, as seen in FIG. 6, the maximum circumferential chamfered-length L24C of the first chamfer 24 is larger than the maximum circumferential chamfered-length L34C of the fifth chamfer 34. The maximum circumferential chamfered-length L34C is equal to or larger than 0.7 mm. The maximum circumferential chamfered-length L34C can be preferably equal to or larger than 1 mm. The maximum circumferential chamfered-length L34C can be preferably equal to or smaller than 1.2 mm. In this embodiment, the maximum circumferential chamfered-length L34C is equal to 0.82 mm.

As seen in FIG. 12, the fifth chamfer 34 has a maximum radial chamfered-length L34R defined between fifth radially outer end 34A and the fifth radially inner end 34B. The maximum radial chamfered-length L34R is larger than the maximum circumferential chamfered-length L34C. As seen in FIG. 6, the maximum radial chamfered-length L24R of the first chamfer 24 is smaller than the maximum radial chamfered-length L34R of the fifth chamfer 34.

Figure 13:
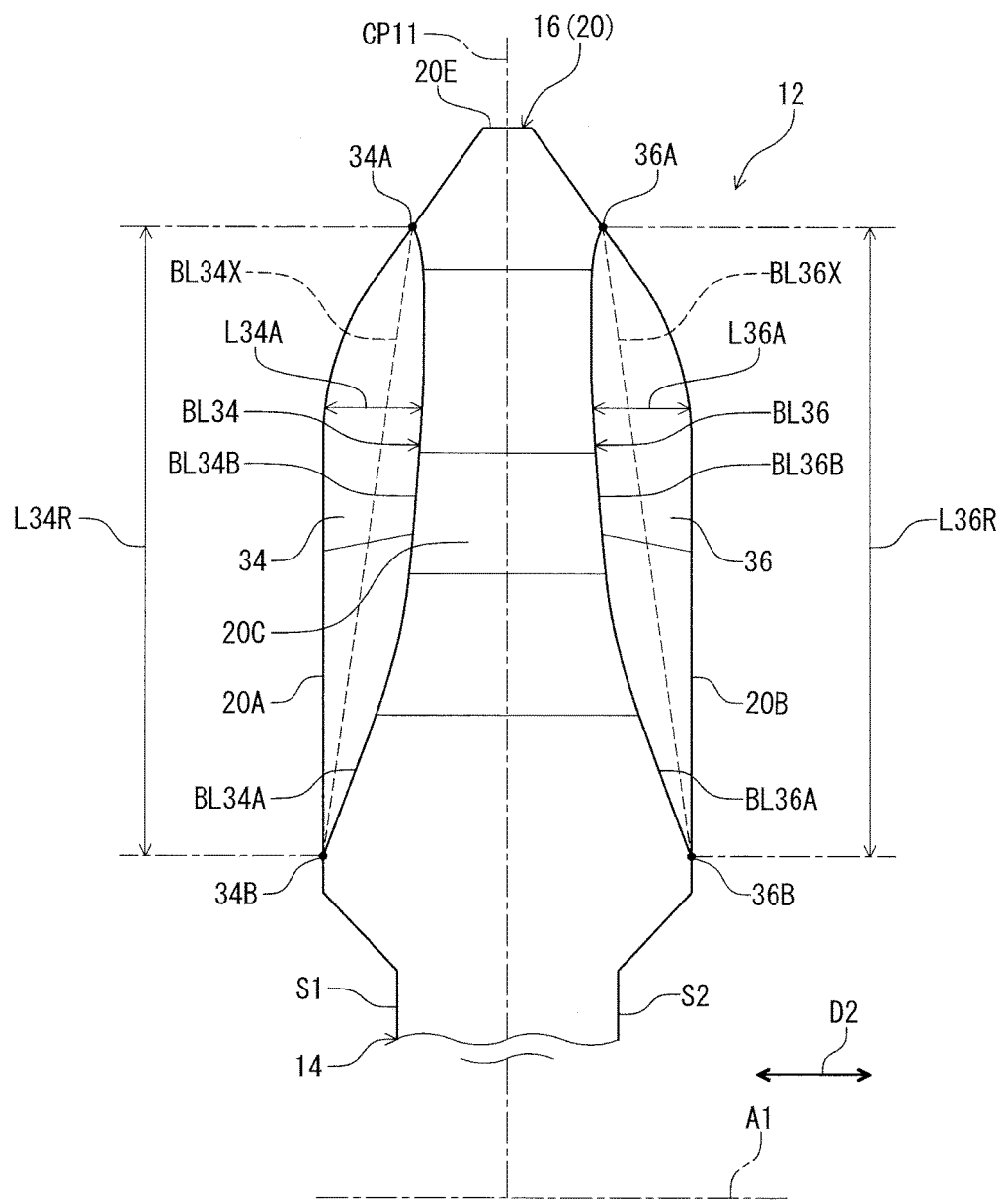
FIG. 13 is an arrow view of the second tooth of the bicycle sprocket taken in a direction of arrow XIII in FIG. 12.

As seen in FIG. 13, the fifth chamfer 34 has a maximum axial chamfered-length L34A defined in the axial direction D2. The maximum axial chamfered-length L34A is smaller than the maximum radial chamfered-length L34R. As seen in FIGS. 12 and 13, the maximum axial chamfered-length L34A is smaller than the maximum circumferential chamfered-length L34C.

As seen in FIG. 13, the at least one first tooth 20 has a border line BL34 defined between the driving surface 20C of the at least one first tooth 20 and the fifth chamfer 34 of the at least one first tooth 20. The border line BL34 includes a straight line BL34A and a curved line BL34B when viewed from the circumferential direction D1. The straight line BL34A linearly extends from the fifth radially inner end 34B when viewed from the circumferential direction D1. The curved line BL34B extends from the fifth radially outer end 34A to the straight line BL34A. The curved line BL34B has a curved shape protruding toward the second axial surface 20B when viewed from the circumferential direction D1. As indicated with a broken line BL34X in FIG. 13, however, the border line BL34 can entirely be a straight line when viewed from the circumferential direction D1.

As seen in FIG. 6, the maximum circumferential chamfered-length L34C is defined in the circumferential direction D1 at a radial position defined between the tooth tip 20E of the at least one first tooth 20 and the reference line RL. The fifth radially inner end 34B is disposed radially inwardly of the reference line RL.

Figure 14:
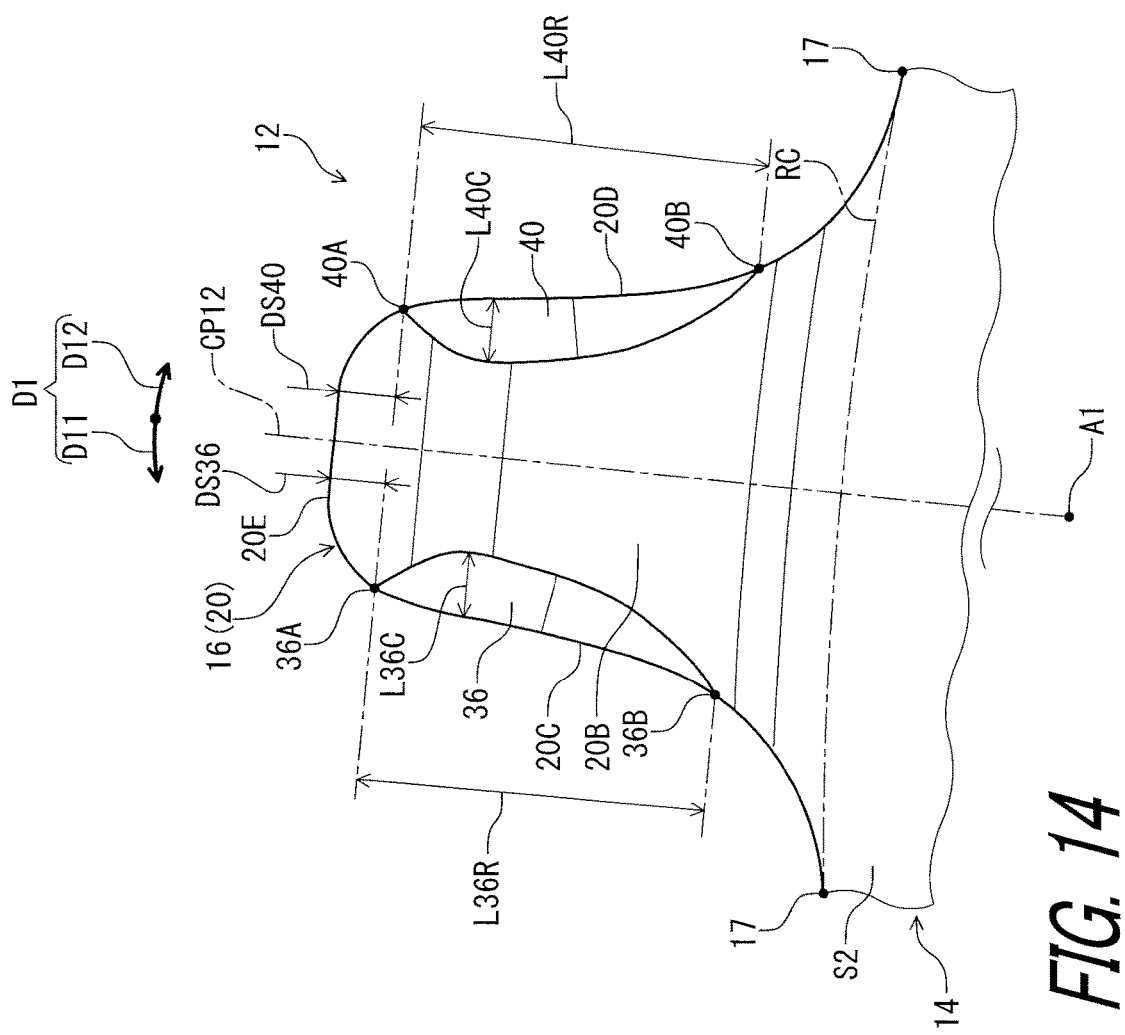
FIG. 14 is an enlarged partial side elevational view of the first tooth of the bicycle sprocket illustrated in FIG. 2.

As seen in FIG. 14, the at least one first tooth 20 includes a sixth chamfer 36 provided between the second axial surface 20B of the at least one first tooth 20 and the driving surface 20C of the at least one first tooth 20. The sixth chamfer 36 has a sixth radially outer end 36A and a sixth radially inner end 36B and radially extends between the sixth radially outer end 36A and the sixth radially inner end 36B. The sixth radially outer end 36A is closer to the tooth tip 20E of the at least one first tooth 20 than the sixth radially inner end 36B. The sixth radially outer end 36A is disposed radially inwardly of the tooth tip 20E of the at least one first tooth 20. The sixth radially inner end 36B is disposed radially inwardly of the sixth radially outer end 36A. A distance DS36 defined between the sixth radially outer end 36A and the tooth tip 20E is 0.7 mm, for example.

The sixth chamfer 36 has a maximum circumferential chamfered-length L36C defined in the circumferential direction D1 at a radial position defined between the sixth radially outer end 36A and the sixth radially inner end 36B. In this embodiment, as seen in FIG. 10, the maximum circumferential chamfered-length L26C of the second chamfer 26 is larger than the maximum circumferential chamfered-length L36C of the sixth chamfer 36. The maximum circumferential chamfered-length L36C is equal to or larger than 0.7 mm. The maximum circumferential chamfered-length L36C can be preferably equal to or larger than 1 mm. The maximum circumferential chamfered-length L36C can be preferably equal to or smaller than 1.2 mm. In this embodiment, the maximum circumferential chamfered-length L36C is equal to 0.82 mm.

As seen in FIG. 14, the sixth chamfer 36 has a maximum radial chamfered-length L36R defined between sixth radially outer end 36A and the sixth radially inner end 36B. The maximum radial chamfered-length L36R is larger than the maximum circumferential chamfered-length L36C. As seen in FIG. 6, the maximum radial chamfered-length L24R of the first chamfer 24 is smaller than the maximum radial chamfered-length L36R of the sixth chamfer 36.

As seen in FIG. 13, the sixth chamfer 36 has a maximum axial chamfered-length L36A defined in the axial direction D2. The maximum axial chamfered-length L36A is smaller than the maximum radial chamfered-length L36R. As seen in FIGS. 13 and 14, the maximum axial chamfered-length L36A is smaller than the maximum circumferential chamfered-length L36C.

As seen in FIG. 13, the at least one first tooth 20 has a border line BL36 defined between the driving surface 20C of the at least one first tooth 20 and the sixth chamfer 36 of the at least one first tooth 20. The border line BL36 includes a straight line BL36A and a curved line BL36B when viewed from the circumferential direction D1. The straight line BL36A linearly extends from the sixth radially inner end 36B when viewed from the circumferential direction D1. The curved line BL36B extends from the sixth radially outer end 36A to the straight line BL36A. The curved line BL36B has a curved shape protruding toward the first axial surface 20A when viewed from the circumferential direction D1. As indicated with a broken line BL36X in FIG. 13, however, the border line BL36 can entirely be a straight line when viewed from the circumferential direction D1.

As seen in FIG. 10, the maximum circumferential chamfered-length L36C is defined in the circumferential direction D1 at a radial position defined between the tooth tip 20E of the at least one first tooth 20 and the reference line RL. The sixth radially inner end 36B is disposed radially inwardly of the reference line RL.

As seen in FIG. 12, the at least one first tooth 20 includes a seventh chamfer 38 provided between the first axial surface 20A of the at least one first tooth 20 and the non-driving surface 20D of the at least one first tooth 20. The seventh chamfer 38 has a seventh radially outer end 38A and a seventh radially inner end 38B and radially extends between the seventh radially outer end 38A and the seventh radially inner end 38B. The seventh radially outer end 38A is closer to the tooth tip 20E of the at least one first tooth 20 than the seventh radially inner end 38B. The seventh radially outer end 38A is disposed radially inwardly of the tooth tip 20E of the at least one first tooth 20. The seventh radially inner end 38B is disposed radially inwardly of the seventh radially outer end 38A. A distance DS38 defined between the seventh radially outer end 38A and the tooth tip 20E is 0.7 mm, for example.

The seventh chamfer 38 has a maximum circumferential chamfered-length L38C defined in the circumferential direction D1 at a radial position defined between the seventh radially outer end 38A and the seventh radially inner end 38B. In this embodiment, as seen in FIG. 6, the maximum circumferential chamfered-length L28C of the third chamfer 28 is larger than the maximum circumferential chamfered-length L38C of the seventh chamfer 38. The maximum circumferential chamfered-length L38C is equal to or larger than 0.7 mm. The maximum circumferential chamfered-length L38C can be preferably equal to or larger than 1 mm. The maximum circumferential chamfered-length L38C can be preferably equal to or smaller than 1.2 mm. In this embodiment, the maximum circumferential chamfered-length L38C is equal to 0.82 mm.

As seen in FIG. 12, the seventh chamfer 38 has a maximum radial chamfered-length L38R defined between seventh radially outer end 38A and the seventh radially inner end 38B. The maximum radial chamfered-length L38R is larger than the maximum circumferential chamfered-length L38C. As seen in FIG. 6, the maximum radial chamfered-length L28R of the third chamfer 28 is smaller than the maximum radial chamfered-length L38R of the seventh chamfer 38.

Figure 15:
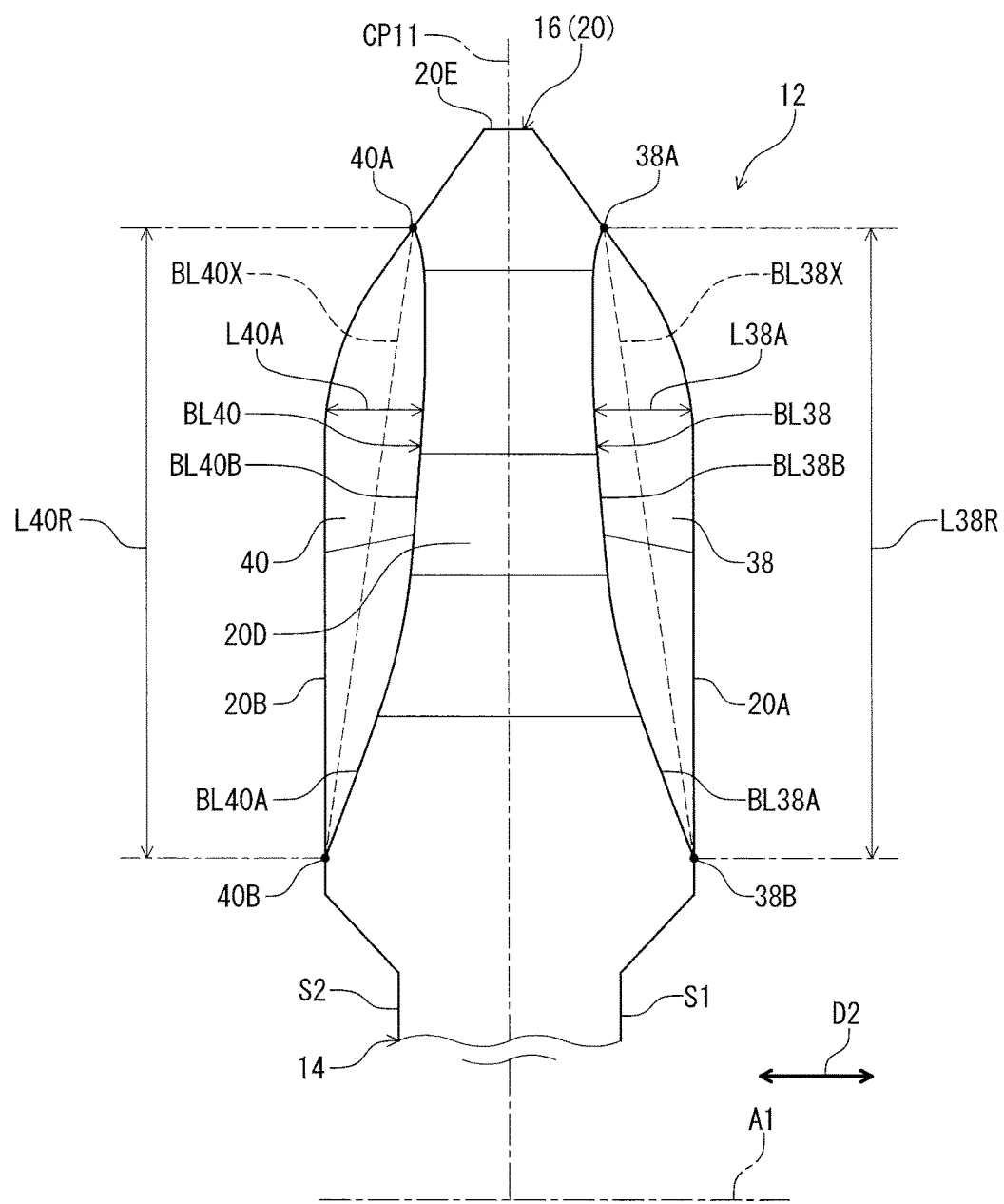
FIG. 15 is an arrow view of the second tooth of the bicycle sprocket taken in a direction of arrow XV in FIG. 12.

As seen in FIG. 15, the seventh chamfer 38 has a maximum axial chamfered-length L38A defined in the axial direction D2. The maximum axial chamfered-length L38A is smaller than the maximum radial chamfered-length L38R. As seen in FIGS. 12 and 15, the maximum axial chamfered-length L38A is smaller than the maximum circumferential chamfered-length L38C.

As seen in FIG. 15, the at least one first tooth 20 has a border line BL38 defined between the non-driving surface 20D of the at least one first tooth 20 and the seventh chamfer 38 of the at least one first tooth 20. The border line BL38 includes a straight line BL38A and a curved line BL38B when viewed from the circumferential direction D1. The straight line BL38A linearly extends from the seventh radially inner end 38B when viewed from the circumferential direction D1. The curved line BL38B extends from the seventh radially outer end 38A to the straight line BL38A. The curved line BL38B has a curved shape protruding toward the second axial surface 20B when viewed from the circumferential direction D1. As indicated with a broken line BL38X in FIG. 15, however, the border line BL38 can entirely be a straight line when viewed from the circumferential direction D1.

As seen in FIG. 6, the maximum circumferential chamfered-length L38C is defined in the circumferential direction D1 at a radial position defined between the tooth tip 20E of the at least one first tooth 20 and the reference line RL. The seventh radially inner end 38B is disposed radially inwardly of the reference line RL.

As seen in FIG. 14, the at least one first tooth 20 includes an eighth chamfer 40 provided between the second axial surface 20B of the at least one first tooth 20 and the non-driving surface 20D of the at least one first tooth 20. The eighth chamfer 40 has an eighth radially outer end 40A and an eighth radially inner end 40B and radially extends between the eighth radially outer end 40A and the eighth radially inner end 40B. The eighth radially outer end 40A is closer to the tooth tip 20E of the at least one first tooth 20 than the eighth radially inner end 40B. The eighth radially outer end 40A is disposed radially inwardly of the tooth tip 20E of the at least one first tooth 20. The eighth radially inner end 40B is disposed radially inwardly of the eighth radially outer end 40A. A distance DS40 defined between the eighth radially outer end 40A and the tooth tip 20E is 0.7 mm, for example.

The eighth chamfer 40 has a maximum circumferential chamfered-length L40C defined in the circumferential direction D1 at a radial position defined between the eighth radially outer end 40A and the eighth radially inner end 40B. In this embodiment, as seen in FIG. 10, the maximum circumferential chamfered-length L30C of the fourth chamfer 30 is larger than the maximum circumferential chamfered-length L40C of the eighth chamfer 40. The maximum circumferential chamfered-length L40C is equal to or larger than 0.7 mm. The maximum circumferential chamfered-length L40C can be preferably equal to or larger than 1 mm. The maximum circumferential chamfered-length L40C can be preferably equal to or smaller than 1.2 mm. In this embodiment, the maximum circumferential chamfered-length L40C is equal to 0.82 mm.

As seen in FIG. 14, the eighth chamfer 40 has a maximum radial chamfered-length L40R defined between eighth radially outer end 40A and the eighth radially inner end 40B. The maximum radial chamfered-length L40R is larger than the maximum circumferential chamfered-length L40C. As seen in FIG. 10, the maximum radial chamfered-length L30R of the fourth chamfer 30 is smaller than the maximum radial chamfered-length L40R of the eighth chamfer 40.

As seen in FIG. 15, the eighth chamfer 40 has a maximum axial chamfered-length L40A defined in the axial direction D2. The maximum axial chamfered-length L40A is smaller than the maximum radial chamfered-length L40R. As seen in FIGS. 14 and 15, the maximum axial chamfered-length L40A is smaller than the maximum circumferential chamfered-length L40C.

As seen in FIG. 15, the at least one first tooth 20 has a border line BL40 defined between the non-driving surface 20D of the at least one first tooth 20 and the eighth chamfer 40 of the at least one first tooth 20. The border line BL40 includes a straight line BL40A and a curved line BL40B when viewed from the circumferential direction D1. The straight line BL40A linearly extends from the eighth radially inner end 40B when viewed from the circumferential direction D1. The curved line BL40B extends from the eighth radially outer end 40A to the straight line BL40A. The curved line BL40B has a curved shape protruding toward the first axial surface 20A when viewed from the circumferential direction D1. As indicated with a broken line BL40X in FIG. 15, however, the border line BL40 can entirely be a straight line when viewed from the circumferential direction D1.

As seen in FIG. 10, the maximum circumferential chamfered-length L40C is defined in the circumferential direction D1 at a radial position defined between the tooth tip 20E of the at least one first tooth 20 and the reference line RL. The eighth radially inner end 40B is disposed radially inwardly of the reference line RL.

As seen in FIG. 13, the fifth chamfer 34 and the sixth chamfer 36 are symmetrical with respect to the axial center plane CP11. As seen in FIG. 15, the seventh chamfer 38 and the eighth chamfer 40 are symmetrical with respect to the axial center plane CP11. As seen in FIGS. 12 and 14, the first tooth 20 has a circumferential center plane CP12 defined to extend radially outwardly from the rotational center axis A1. As seen in FIG. 12, the fifth chamfer 34 and the seventh chamfer 38 are symmetrical with respect to the circumferential center plane CP12. As seen in FIG. 14, the sixth chamfer 36 and the eighth chamfer 40 are symmetrical with respect to the circumferential center plane CP12. However, the fifth chamfer 34 and the sixth chamfer 36 can be asymmetrical with respect to the axial center plane CP11. One of the fifth chamfer 34 and the sixth chamfer 36 can be omitted from the first tooth 20. In such an embodiment, a distance defined between the axial center plane CP11 and the first axial surface 20A is preferably different from a distance defined between the axial center plane CP11 and the second axial surface 20B. In a case where the fifth chamfer 34 is omitted from the first tooth 20, a distance defined between the axial center plane CP11 and the first axial surface 20A is preferably shorter than a distance defined between the axial center plane CP11 and the second axial surface 20B. In a case where the sixth chamfer 36 is omitted from the first tooth 20, a distance defined between the axial center plane CP11 and the second axial surface 20B is preferably shorter than a distance defined between the axial center plane CP11 and the first axial surface 20A. The seventh chamfer 38 and the eighth chamfer 40 can be asymmetrical with respect to the axial center plane CP11. The fifth chamfer 34 and the seventh chamfer 38 can be asymmetrical with respect to the circumferential center plane CP12. The sixth chamfer 36 and the eighth chamfer 40 can be asymmetrical with respect to the circumferential center plane CP12.

Figure 16:
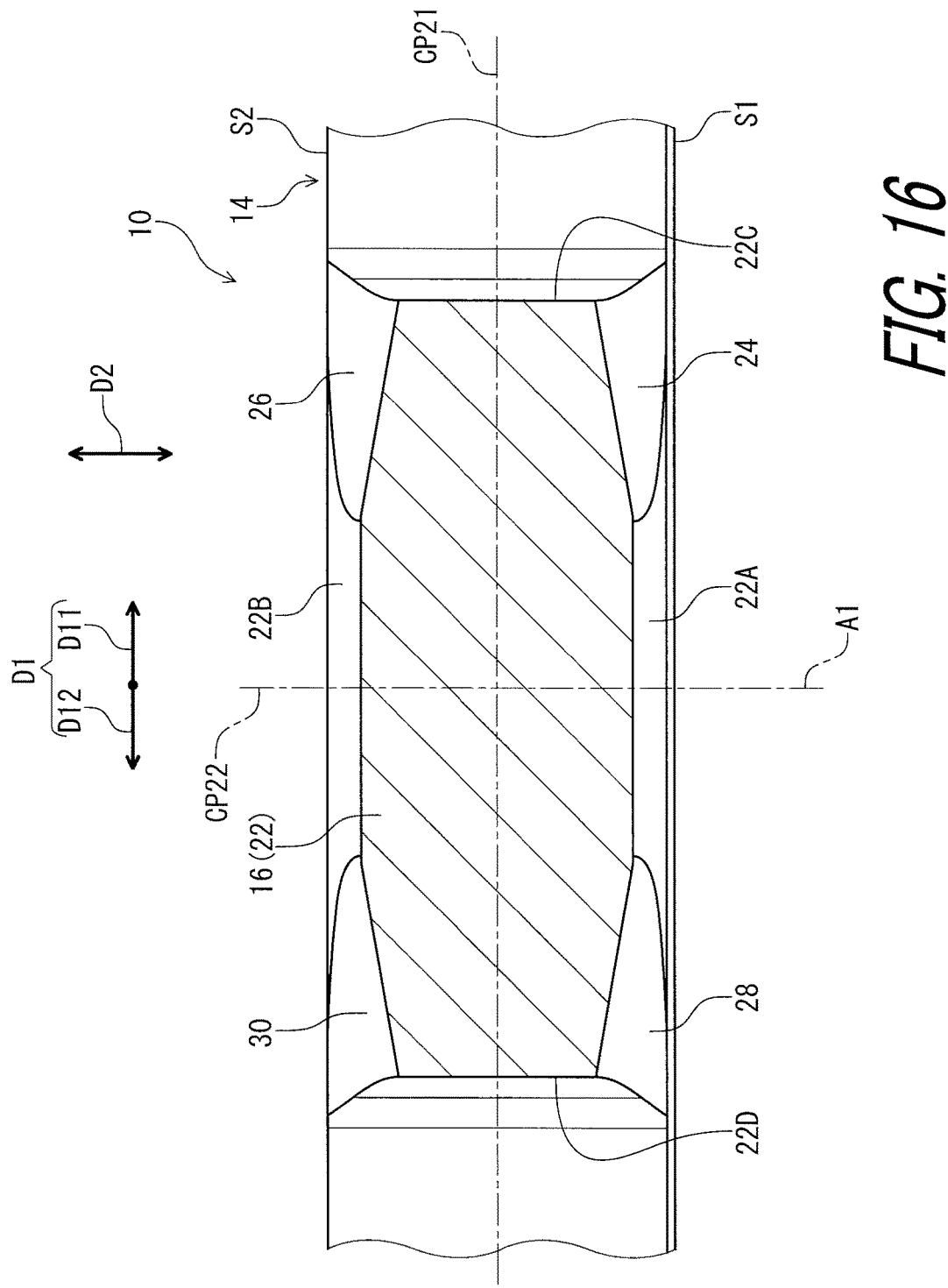
FIG. 16 is a cross-sectional view of the bicycle sprocket taken along line XVI-XVI of FIG. 7.

As seen in FIG. 16, the first chamfer 24 is inclined with respect to the first axial surface 22A of the second tooth 22 and the driving surface 22C of the second tooth 22. The second chamfer 26 is inclined with respect to the second axial surface 22B of the second tooth 22 and the driving surface 22C of the second tooth 22. The third chamfer 28 is inclined with respect to the first axial surface 22A of the second tooth 22 and the non-driving surface 22D of the second tooth 22. The fourth chamfer 30 is inclined with respect to the second axial surface 22B of the second tooth 22 and the non-driving surface 22D of the second tooth 22.

Figure 17:
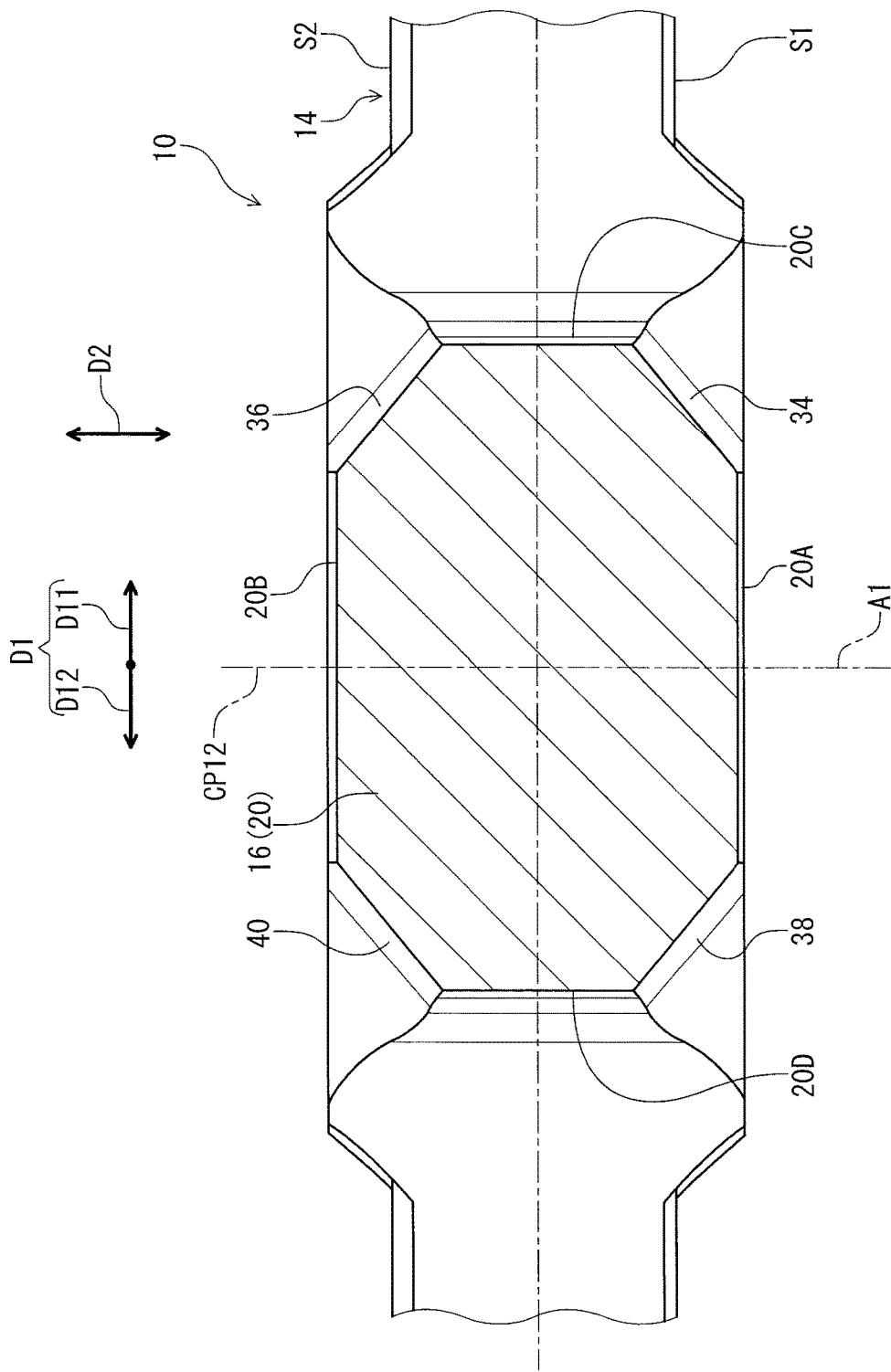
FIG. 17 is a cross-sectional view of the bicycle sprocket taken along line XVII-XVII of FIG. 7.

As seen in FIG. 17, the fifth chamfer 34 is inclined with respect to the first axial surface 20A of the first tooth 20 and the driving surface 20C of the first tooth 20. The sixth chamfer 36 is inclined with respect to the second axial surface 20B of the first tooth 20 and the driving surface 20C of the first tooth 20. The seventh chamfer 38 is inclined with respect to the first axial surface 20A of the first tooth 20 and the non-driving surface 20D of the first tooth 20. The eighth chamfer 40 is inclined with respect to the second axial surface 20B of the first tooth 20 and the non-driving surface 20D of the first tooth 20.

Figure 18:
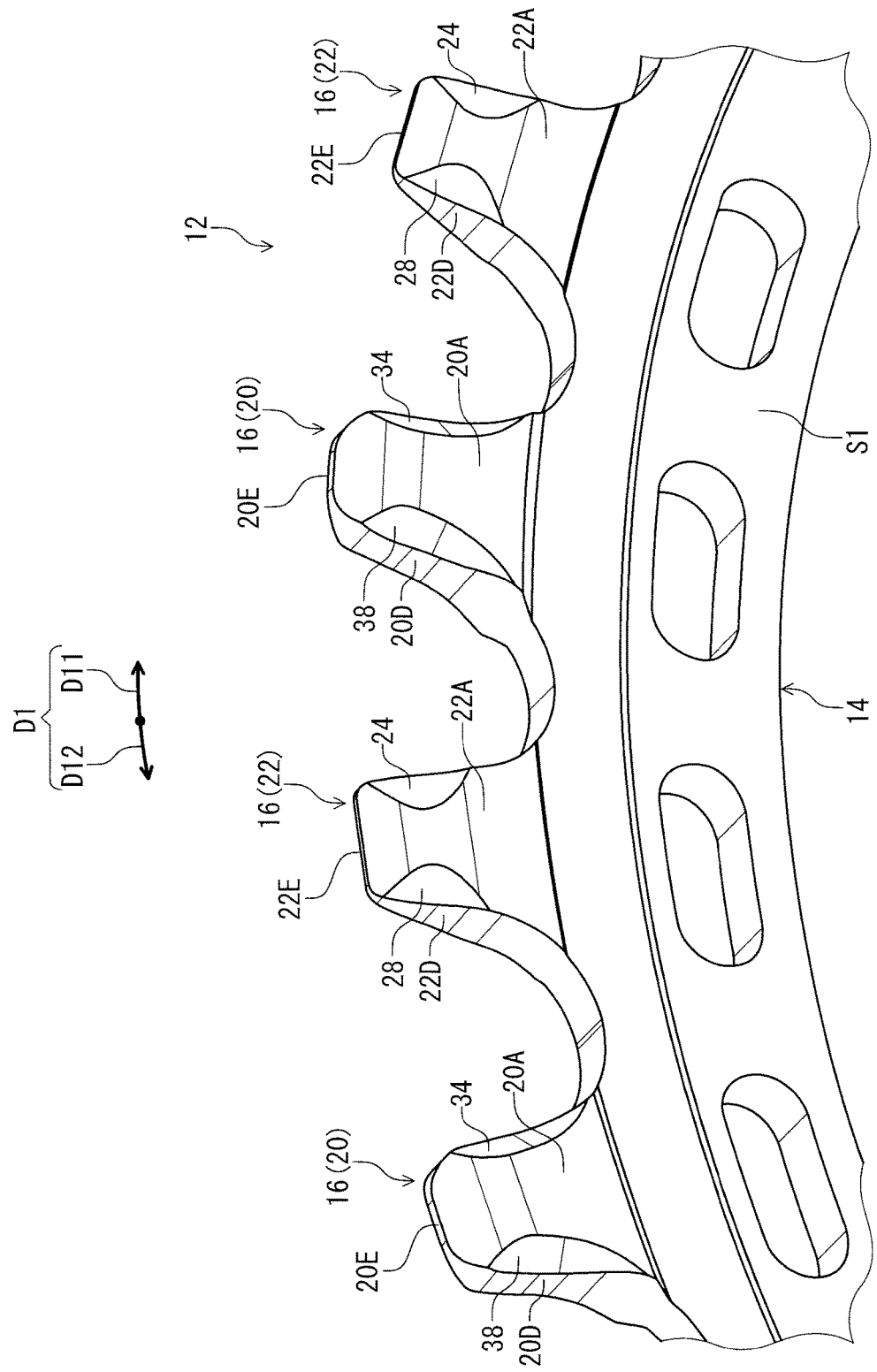
FIG. 18 is a partial perspective view of the bicycle sprocket illustrated in FIG. 2.
Figure 19:
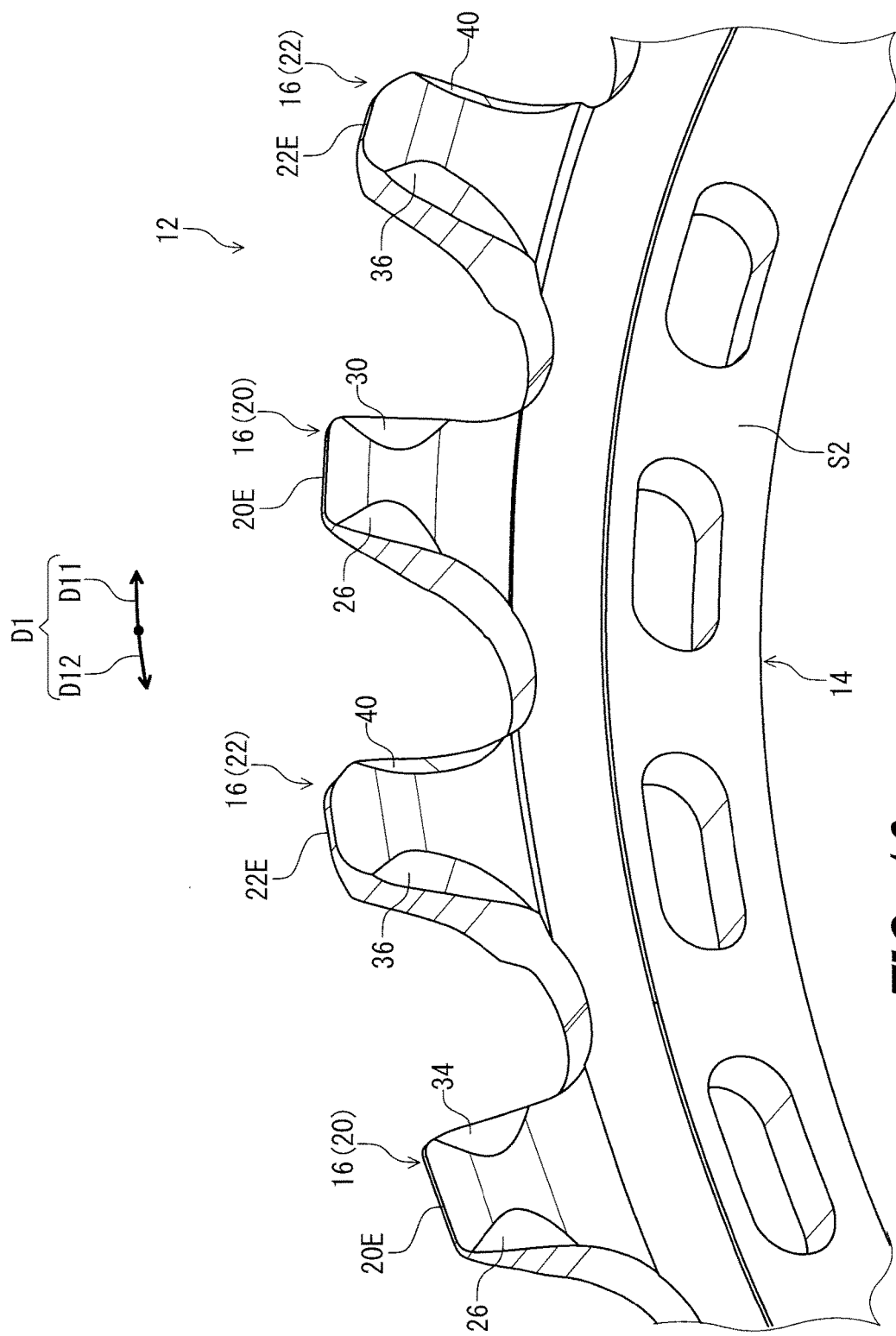
FIG. 19 is another partial perspective view of the bicycle sprocket illustrated in FIG. 2.

As seen in FIGS. 18 and 19, the first chamfer 24 has a smooth surface. The second chamfer 26 has a smooth surface. The third chamfer 28 has a smooth surface. The fourth chamfer 30 has a smooth surface. The fifth chamfer 34 has a smooth surface. The sixth chamfer 36 has a smooth surface. The seventh chamfer 38 has a smooth surface. The eighth chamfer 40 has a smooth surface.

As seen in FIG. 1, a chain line CL is defined by the bicycle chain C engaged with the bicycle sprocket assembly 10 and the rear sprocket assembly RS. For example, a first chain line CL1 is defined by the bicycle chain C engaged with the bicycle sprocket 12 and the rear sprocket SP1. A second chain line CL2 is defined by the bicycle chain C engaged with the bicycle sprocket 12 and the rear sprocket SP11. An axial distance CD is defined between the chain line CL and a transverse center plane FC of the bicycle frame BF in the axial direction D2. The transverse center plane FC is perpendicular to the rotational center axis A1 in a state where the bicycle sprocket 12 is mounted to the bicycle frame BF. The first chain line CL1 is inclined relative to the transverse center plane FC to decrease the axial distance CD from the bicycle sprocket 12 to the rear sprocket assembly RS. The first chain line CL1 is inclined relative to the bicycle sprocket 12 toward a first side SD1 relative to the bicycle sprocket 12. The second chain line CL2 is inclined relative to the transverse center plane FC to increase the axial distance CD from the bicycle sprocket 12 to the rear sprocket assembly RS. The second chain line CL2 is inclined relative to the bicycle sprocket 12 toward a second side SD2 relative to the bicycle sprocket 12.

Figure 20:
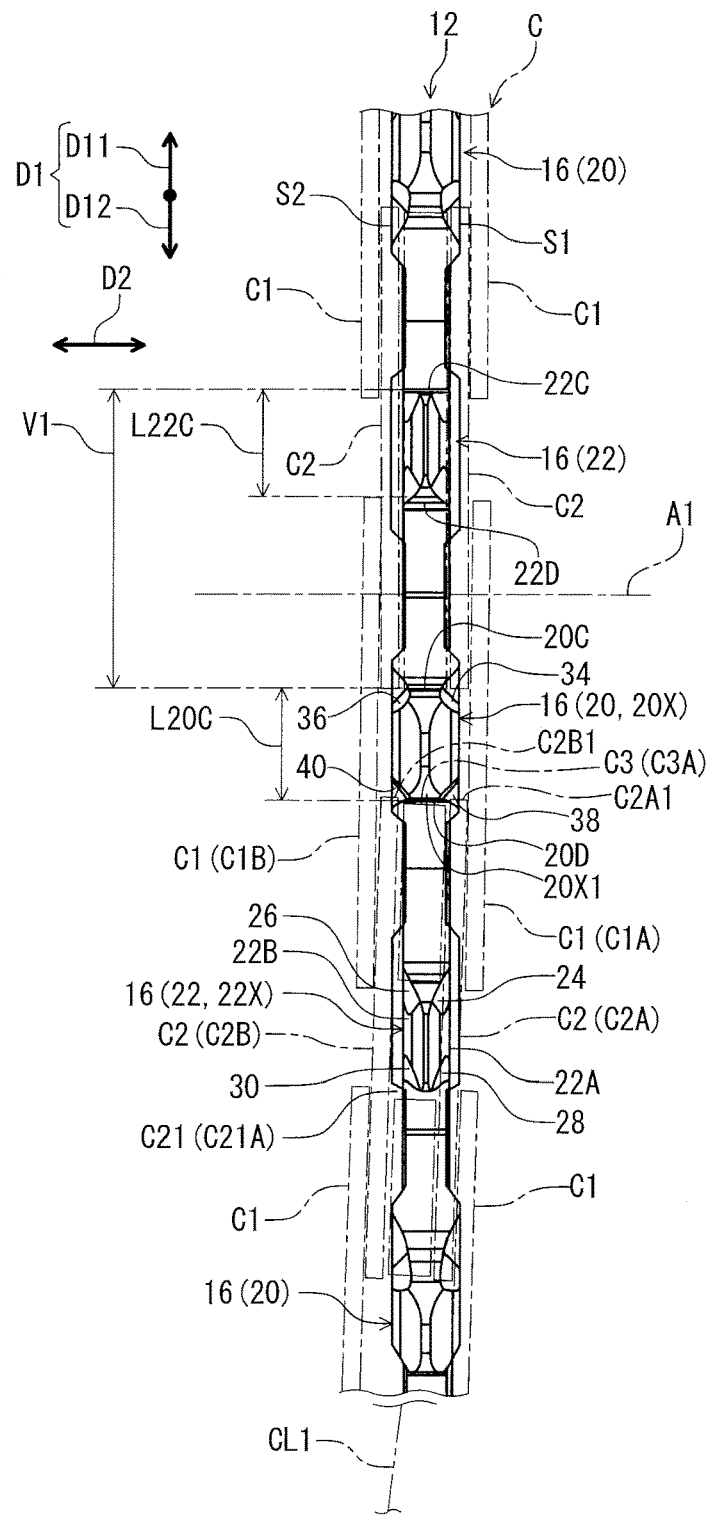
FIG. 20 is a top view of the bicycle sprocket illustrated in FIG. 2 with the bicycle chain (first chain line).
Figure 21:
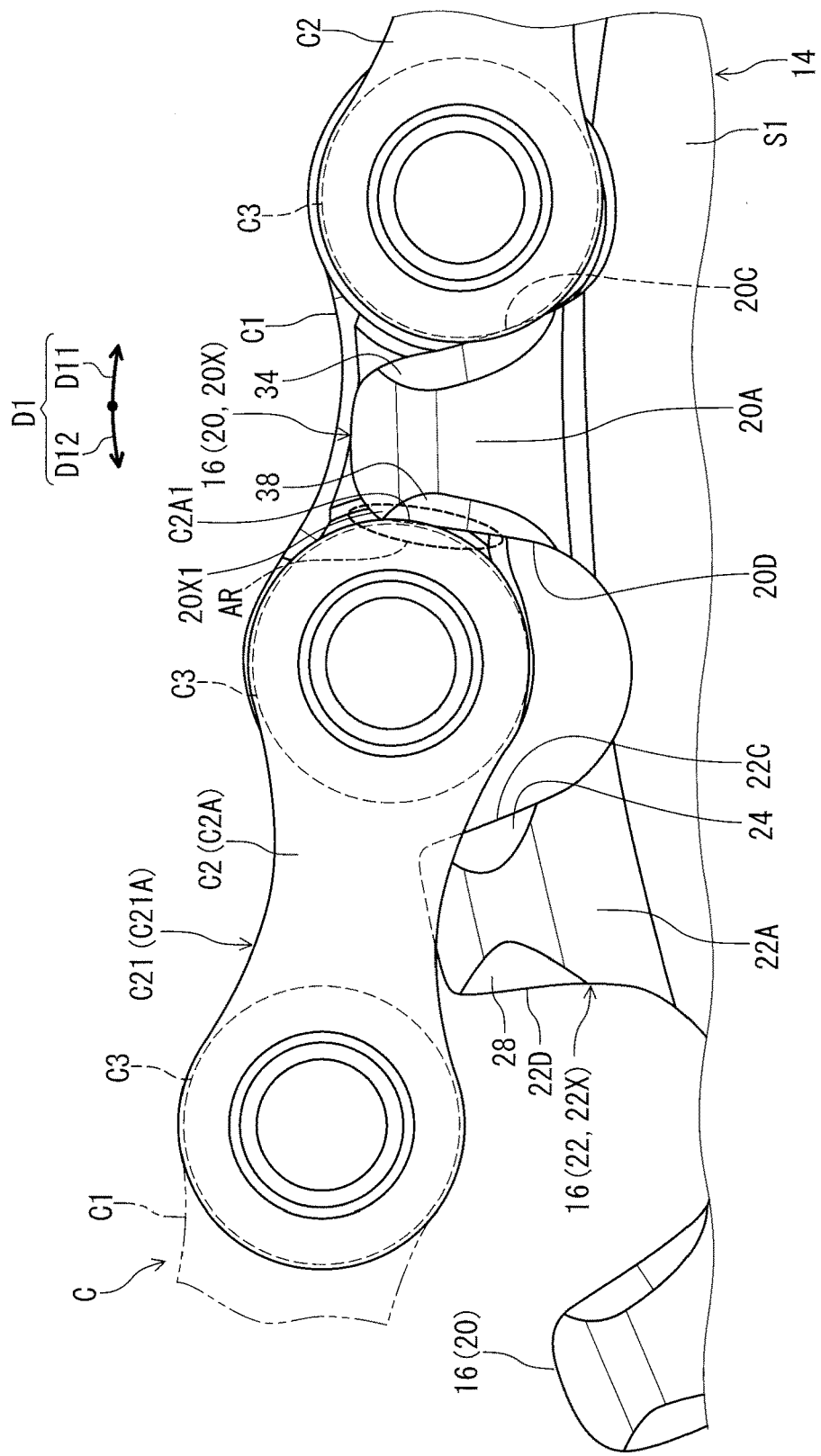
FIG. 21 is a partial side elevational view of the bicycle sprocket illustrated in FIG. 2 with the bicycle chain (first chain line).

As seen in FIGS. 20 and 21, the second tooth 22X is inserted into the inner link space C21A when the bicycle sprocket 12 is rotated in the driving rotational direction D11 in a first chain state where the bicycle chain C extends along the first chain line CL1. The second tooth 22X comes into contact with the inner link plate C2A. The first chamfer 24 smoothly guides the inner link plate C2A when the inner link plate C2A comes into engagement with the second tooth 22X even if the chain line CL (e.g., the first chain line CL1) of the bicycle chain C is inclined relative to the bicycle sprocket 12 toward the first side SD1 relative to the bicycle sprocket 12. This smoothes the engagement of the bicycle chain C with the second tooth 22X, reducing noise occurring when the bicycle chain C comes into engagement with the second tooth 22X.

Figure 22:
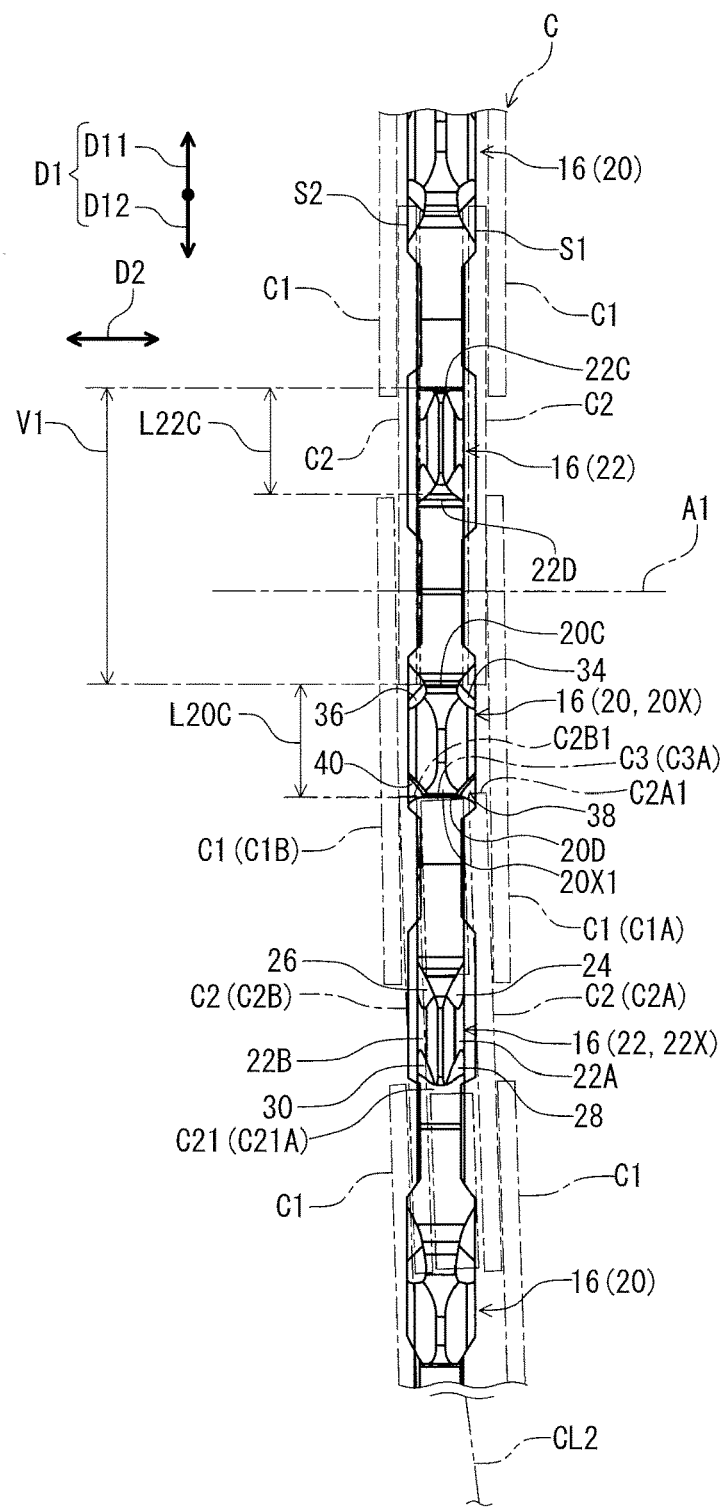
FIG. 22 is a top view of the bicycle sprocket illustrated in FIG. 2 with the bicycle chain (second chain line).

As seen in FIG. 22, the second tooth 22X is inserted into the inner link space C21A when the bicycle sprocket 12 is rotated in the driving rotational direction D11 in a second chain state where the bicycle chain C extends along the second chain line CL2. The second tooth 22X comes into contact with the inner link plate C2B. The second chamfer 26 smoothly guides the inner link plate C2B when the inner link plate C2B comes into engagement with the second tooth 22X even if the chain line CL (e.g., the second chain line CL2) of the bicycle chain C is inclined relative to the bicycle sprocket 12 toward the second side SD2 relative to the bicycle sprocket 12. This smoothes the engagement of the bicycle chain C with the second tooth 22X, reducing noise occurring when the bicycle chain C comes into engagement with the second tooth 22X.

As seen in FIGS. 20 and 22, the first circumferential tooth-length L20C is larger than the second circumferential tooth-length L22C. Furthermore, the first driving surfaces 20C of the first teeth 20 and the second driving surfaces 22C of the second teeth 22 are alternatingly arranged in the circumferential direction D1 at the regular (constant) intervals V1. Thus, a first clearance between the first tooth 20 and the roller C3 of the bicycle chain C is smaller than a second clearance between the second tooth 22 and the roller C3 of the bicycle chain C. Accordingly, the first tooth 20 is more likely to come into contact with the roller C3 of the bicycle chain C in a state where the chain line CL (e.g., the first chain line CL1 and/or the second chain line CL2) defined the bicycle chain C is inclined relative to the bicycle sprocket 12. As seen in FIG. 20, for example, the first tooth 20X is more likely to come into contact with the roller C3A of the bicycle chain C in a first chain state where the bicycle chain C extends along the first chain line CL1. As seen in FIG. 22, the first tooth 20X is more likely to come into contact with the roller C3A of the bicycle chain C in a second chain state where the bicycle chain C extends along the second chain line CL2. This improves chain-holding performance of the bicycle sprocket 12. Thus, this reduces unintentional chain drop.

Furthermore, as seen in FIGS. 20 to 22, a non-driving portion 20X1 (e.g., the non-driving surface 20D and a portion adjacent to the non-driving surface 20D) of the first tooth 20X is at least partly inserted between tip portions C2A1 and C2B1 of the inner link plates C2A and C2B that are disposed between the outer link plates C1A and C1B in each of the first chain state (the first chain line CL1) and the second chain state (the second chain line CL2). As seen in FIG. 20, for example, at least one of the seventh chamfer 38 and the eighth chamfer 40 is more likely to come into contact with a tip portion of a corresponding inner link plate C2 in the first chain state (the first chain line CL1) in an area AR (FIG. 21). As seen in FIG. 22, at least one of the seventh chamfer 38 and the eighth chamfer 40 is more likely to come into contact with a tip portion of a corresponding inner link plate C2 in the second chain state (the second chain line CL2) in the area AR (FIG. 21). This improves the chain-holding performance of the bicycle sprocket 12. Thus, this reduces the unintentional chain drop.

The term "comprising" and its derivatives, as used herein, are intended to be open ended terms that specify the presence of the stated features, elements, components, groups, integers, and/or steps, but do not exclude the presence of other unstated features, elements, components, groups, integers and/or steps. This concept also applies to words of similar meaning, for example, the terms "have," "include" and their derivatives.

The terms "member," "section," "portion," "part," "element," "body" and "structure" when used in the singular can have the dual meaning of a single part or a parts.

The ordinal numbers such as "first" and "second" recited in the present application are merely identifiers, but do not have any other meanings, for example, a particular order and the like. Moreover, for example, the term "first element" itself does not imply an existence of "second element," and the term "second element" itself does not imply an existence of "first element."

The term "pair of," as used herein, can encompass the configuration in which the pair of elements have different shapes or structures from each other in addition to the configuration in which the pair of elements have the same shapes or structures as each other.

The terms "a" (or "an"), "one or more" and "at least one" can be used interchangeably herein.

Finally, terms of degree such as "substantially," "about" and "approximately" as used herein mean a reasonable amount of deviation of the modified term such that the end result is not significantly changed. All of numerical values described in the present application can be construed as including the terms such as "substantially," "about" and "approximately."

Obviously, numerous modifications and variations of the present invention are possible in light of the above teachings. It is therefore to be understood that within the scope of the appended claims, the invention may be practiced otherwise than as specifically described herein.

What is claimed is:

1. A bicycle sprocket comprising:
a sprocket body including a radially outer periphery provided about a rotational center axis of the bicycle sprocket; and
chain-driving teeth provided on the radially outer periphery to engage with a bicycle chain, the chain-driving teeth each having
a first axial surface,
a second axial surface opposite to the first axial surface in an axial direction parallel to the rotational center axis,
a driving surface facing in a driving rotational direction in which the bicycle sprocket is rotated during pedaling, and
a non-driving surface opposite to the driving surface in a circumferential direction defined about the rotational center axis, the chain-driving teeth comprising:
at least one first tooth having a first maximum chain-engaging width defined in the axial direction; and
at least one second tooth having a second maximum chain-engaging width defined in the axial direction, the first maximum chain-engaging width being larger than the second maximum chain-engaging width, the at least one second tooth including a first chamfer provided between the first axial surface of the at least one second tooth and the driving surface of the at least one second tooth, wherein
the first chamfer has a radially outermost end that is a point where the first axial surface of the at least one second tooth and the driving surface of the at least one second tooth meet.

2. The bicycle sprocket according to claim 1, wherein
the first maximum chain-engaging width is larger than an inner link space defined between an opposed pair of inner link plates of the bicycle chain in the axial direction and smaller than an outer link space defined between an opposed pair of outer link plates of the bicycle chain in the axial direction, and
the second maximum chain-engaging width is smaller than the inner link space.

3. The bicycle sprocket according to claim 1, wherein
the first chamfer has a first radially outer end and a first radially inner end and radially extends between the first radially outer end and the first radially inner end, and
the first chamfer has a maximum circumferential chamfered-length defined in the circumferential direction at a radial position defined between the first radially outer end and the first radially inner end.

4. The bicycle sprocket according to claim 1, wherein
the first chamfer has
a maximum circumferential chamfered-length defined in the circumferential direction, and
a maximum axial chamfered-length defined in the axial direction, the maximum axial chamfered-length being smaller than the maximum circumferential chamfered-length.

5. The bicycle sprocket according to claim 1, wherein
the at least one second tooth has a border line defined between the driving surface of the at least one second tooth and the first chamfer of the at least one second tooth, and
the border line includes a straight line when viewed from the circumferential direction.

6. The bicycle sprocket according to claim 1, wherein
the first chamfer has a first radially outer end and a first radially inner end and radially extends between the first radially outer end and the first radially inner end, the first radially outer end being closer to a tooth tip of the at least one second tooth than the first radially inner end, and
the first radially outer end is disposed radially inwardly of the tooth tip of the at least one second tooth.

7. The bicycle sprocket according to claim 1, wherein
the first chamfer has a maximum circumferential chamfered-length defined in the circumferential direction, and
the maximum circumferential chamfered-length is equal to or larger than 0.8 mm.

8. The bicycle sprocket according to claim 1 wherein
the at least one second tooth includes a second chamfer provided between the second axial surface of the at least one second tooth and the driving surface of the at least one second tooth.

9. The bicycle sprocket according to claim 8, wherein
the at least one second tooth has an axial center plane defined to bisect the second maximum chain-engaging width of the at least one second tooth in the axial direction, and
the first chamfer and the second chamfer are symmetrical with respect to the axial center plane.

10. The bicycle sprocket according to claim 1, wherein
the at least one second tooth includes a third chamfer provided between the first axial surface of the at least one second tooth and the non-driving surface of the at least one second tooth.

11. The bicycle sprocket according to claim 10, wherein
the at least one second tooth includes a fourth chamfer provided between the second axial surface of the at least one second tooth and the non-driving surface of the at least one second tooth.

12. The bicycle sprocket according to claim 1, wherein
the at least one first tooth including a fifth chamfer provided between the first axial surface of the at least one first tooth and the driving surface of the at least one first tooth.

13. The bicycle sprocket according to claim 12, wherein
the first chamfer has a first radially outer end and a first radially inner end and radially extends between the first radially outer end and the first radially inner end,
the first chamfer has a maximum circumferential chamfered-length defined in the circumferential direction at a radial position defined between the first radially outer end and the first radially inner end,
the fifth chamfer has a fifth radially outer end and a fifth radially inner end and radially extends between the fifth radially outer end and the fifth radially inner end,
the fifth chamfer has a maximum circumferential chamfered-length defined in the circumferential direction at a radial position defined between the fifth radially outer end and the fifth radially inner end, and
the maximum circumferential chamfered-length of the first chamfer is larger than the maximum circumferential chamfered-length of the fifth chamfer.

14. The bicycle sprocket according to claim 1, wherein
the at least one first tooth has a first axial percentage of the first maximum chain-engaging width in an outer link space defined between an opposed pair of outer link plates of the bicycle chain in the axial direction,
the at least one second tooth has a second axial percentage of the second maximum chain-engaging width in an inner link space defined between an opposed pair of inner link plates of the bicycle chain in the axial direction, and
the first axial percentage is smaller than the second axial percentage.

15. The bicycle sprocket according to claim 14, wherein the second axial percentage is equal to or larger than 80%.

16. The bicycle sprocket according to claim 14, wherein the first axial percentage is equal to or smaller than 80%.

17. The bicycle sprocket according to claim 1, wherein
the first chamfer is inclined with respect to the first axial surface of the second tooth and the driving surface of the second tooth.

18. The bicycle sprocket according to claim 1, wherein the first chamfer has a smooth surface.

19. The bicycle sprocket according to claim 1, wherein the chain-driving teeth are made of a metallic material.

20. The bicycle sprocket according to claim 1, further comprising
one of a crank arm attachment part and a hub assembly attachment part.

21. The bicycle sprocket according to claim 1, wherein
a total number of the chain-driving teeth is equal to or larger than thirteen.

22. The bicycle sprocket according to claim 1, wherein
the total number of the chain-driving teeth is equal to or larger than thirty.

23. A bicycle sprocket assembly comprising
the bicycle sprocket according to claim 1.

24. A bicycle sprocket comprising:
a sprocket body including a radially outer periphery provided about a rotational center axis of the bicycle sprocket; and
chain-driving teeth provided on the radially outer periphery to engage with a bicycle chain, the chain-driving teeth each having
a first axial surface,
a second axial surface opposite to the first axial surface in an axial direction parallel to the rotational center axis,
a driving surface facing in a driving rotational direction in which the bicycle sprocket is rotated during pedaling, and
a non-driving surface opposite to the driving surface in a circumferential direction defined about the rotational center axis, the chain-driving teeth comprising:
at least one first tooth having a first maximum chain-engaging width defined in the axial direction; and
at least one second tooth having a second maximum chain-engaging width defined in the axial direction, the first maximum chain-engaging width being larger than the second maximum chain-engaging width, the at least one second tooth including a first chamfer provided between the first axial surface of the at least one second tooth and the driving surface of the at least one second tooth, wherein
the first chamfer has a maximum circumferential chamfered-length defined in the circumferential direction at a radial position defined between a tooth tip of the at least one second tooth and a reference line constituting a pitch circle of the bicycle sprocket defined to connect centers of neighboring pins of the bicycle chain engaged with the chain-driving teeth when viewed from the axial direction.

25. The bicycle sprocket according to claim 24, wherein
the first chamfer has a first radially outer end and a first radially inner end and radially extends between the first radially outer end and the first radially inner end,
the first radially outer end is closer to a tooth tip of the at least one second tooth than the first radially inner end, and
the first radially inner end is disposed radially inwardly of the reference line.

26. A bicycle sprocket comprising:
a sprocket body including a radially outer periphery provided about a rotational center axis of the bicycle sprocket; and
chain-driving teeth provided on the radially outer periphery to engage with a bicycle chain, the chain-driving teeth each having
a first axial surface,
a second axial surface opposite to the first axial surface in an axial direction parallel to the rotational center axis,
a driving surface facing in a driving rotational direction in which the bicycle sprocket is rotated during pedaling, and
a non-driving surface opposite to the driving surface in a circumferential direction defined about the rotational center axis, the chain-driving teeth comprising:
at least one first tooth having a first maximum chain-engaging width defined in the axial direction; and
at least one second tooth having a second maximum chain-engaging width defined in the axial direction, the first maximum chain-engaging width being larger than the second maximum chain-engaging width, the at least one second tooth including a first chamfer provided between the first axial surface of the at least one second tooth and the driving surface of the at least one second tooth, wherein
the at least one first tooth including a fifth chamfer provided between the first axial surface of the at least one first tooth and the driving surface of the at least one first tooth, the first chamfer has a maximum radial chamfered-length defined between the first radially outer end and the first radially inner end, the fifth chamfer has a maximum radial chamfered-length defined between fifth radially outer end and a fifth radially inner end, and the maximum radial chamfered-length of the first chamfer is smaller than the maximum radial chamfered-length of the fifth chamfer.

27. A bicycle sprocket comprising:

a sprocket body including a radially outer periphery provided about a rotational center axis of the bicycle sprocket; and chain-driving teeth provided on the radially outer periphery to engage with a bicycle chain, the chain-driving teeth each having a first axial surface, a second axial surface opposite to the first axial surface in an axial direction parallel to the rotational center axis, a driving surface facing in a driving rotational direction in which the bicycle sprocket is rotated during pedaling, and a non-driving surface opposite to the driving surface in a circumferential direction defined about the rotational center axis, the chain-driving teeth comprising:

at least one first tooth having a first maximum chain-engaging width defined in the axial direction; and at least one second tooth having a second maximum chain-engaging width defined in the axial direction, the first maximum chain-engaging width being larger than the second maximum chain-engaging width, the at least one second tooth including a first chamfer provided between the first axial surface of the at least one second tooth and the driving surface of the at least one second tooth, wherein the first chamfer has a first radially outermost end and a first radially innermost end, the at least one second tooth has a border line defined between the first axial surface of the at least one second tooth and the first chamfer of the at least one second tooth, and the border line is a continuous arc that extends from the first radially outermost end to the first radially innermost end when viewed in the axial direction.

* * * * *